US012754917B2

(12) United States Patent
Batra et al.

(10) Patent No.: US 12,754,917 B2
(45) Date of Patent: Oct. 6, 2026

(54) AUTOMATED LANGUAGE MODEL-BASED TRAINING FRAMEWORK FOR MACHINE LEARNING CLASSIFIERS

(71) Applicant: Optum, Inc., Minnetonka, MN (US)

(72) Inventors: Sanjit Singh Batra, Millbrae, CA (US); Robert Elliott Tillman, Long Island City, NY (US); Ardavan Saeedi, Jersey City, NJ (US); Joel David Stremmel, Iowa City, IA (US)

(73) Assignee: OPTUM, INC., Minnetonka, MN (US)

( * ) Notice: Subject to any disclaimer, the term of this patent is extended or adjusted under 35 U.S.C. 154(b) by 0 days.

(21) Appl. No.: 18/986,876

(22) Filed: Dec. 19, 2024

(65) Prior Publication Data

US 2026/0178589 A1 Jun. 25, 2026

(51) Int. Cl.

| | |
|---|---|
| ***G06F 7/00*** | (2006.01) |
| ***G06F 16/22*** | (2019.01) |
| ***G06F 16/2455*** | (2019.01) |
| ***G06N 3/0895*** | (2023.01) |

(52) U.S. Cl.
CPC .... *G06F 16/24558* (2019.01); *G06F 16/2237* (2019.01); *G06N 3/0895* (2023.01)

(58) Field of Classification Search
CPC .......... G06F 16/24558; G06F 16/2237; G06N 3/0895
See application file for complete search history.

(56) References Cited

U.S. PATENT DOCUMENTS

| | | | | |
|---|---|---|---|---|
| 11,048,887 | B1 * | 6/2021 | Gupta | G06N 3/045 |
| 11,532,387 | B2 | 12/2022 | Dandala et al. | |
| 2020/0082210 | A1 * | 3/2020 | Watson | G06F 18/22 |
| 2020/0130177 | A1 * | 4/2020 | Kolouri | G06N 3/045 |
| 2021/0004440 | A1 * | 1/2021 | Pumell | G06F 16/3347 |
| 2021/0125721 | A1 | 4/2021 | Kemp et al. | |
| 2021/0183484 | A1 | 6/2021 | Shaib et al. | |

(Continued)

FOREIGN PATENT DOCUMENTS

WO 2024/167887 A1 8/2024

OTHER PUBLICATIONS

Rasmy, et al., "Med-BERT: Pretrained Contextualized Embeddings on Large-Scale Structured Electronic Health Records for Disease Prediction", Digital Medicine, vol. 4, No. 86, May 20, 2021, (13 pages), doi: 10.1038/s41746-021-00455-y.

*Primary Examiner* — Mohammed R Uddin
(74) *Attorney, Agent, or Firm* — Alston & Bird LLP

(57) ABSTRACT

Various embodiments of the present disclosure provide an automated language model-based training framework for machine learning classifiers. The techniques comprise receiving a data request that includes a search parameter to be applied to a plurality of data elements, generating a search embedding corresponding to the search parameter via an encoder language model, detecting a first subset of data elements among the plurality of data elements that comprise corresponding embeddings that align with the search embedding in accordance with a first threshold, detecting a second subset of data elements among the first subset of data elements that comprise corresponding classification scores that satisfy a second threshold, and transmitting one or more data packets that comprises one or more data elements of the second subset of data elements in response to the data request.

20 Claims, 14 Drawing Sheets

(56) References Cited

U.S. PATENT DOCUMENTS

| | | | | |
|---|---|---|---|---|
| 2021/0327413 | A1* | 10/2021 | Suwandy | G10L 15/197 |
| 2021/0374553 | A1* | 12/2021 | Li | G06V 10/7792 |
| 2021/0403036 | A1* | 12/2021 | Danna | G01C 21/3407 |
| 2022/0067506 | A1* | 3/2022 | Li | G06V 10/7753 |
| 2022/0108074 | A1* | 4/2022 | Kehler | G06N 3/0455 |
| 2022/0121822 | A1* | 4/2022 | Zhou | G06N 3/047 |
| 2022/0172269 | A1* | 6/2022 | Shan | G06N 3/049 |
| 2022/0230089 | A1* | 7/2022 | Peraud | G06N 20/00 |
| 2022/0318229 | A1* | 10/2022 | Shreve | G06F 16/2379 |
| 2023/0197220 | A1 | 6/2023 | Blarre et al. | |
| 2023/0335243 | A1 | 10/2023 | Mukherjee et al. | |
| 2023/0376835 | A1* | 11/2023 | Malkiel | G06N 3/0895 |
| 2023/0386479 | A1* | 11/2023 | Zhang | G10L 19/00 |
| 2023/0409614 | A1* | 12/2023 | Hamilton | G06F 16/9024 |
| 2024/0062571 | A1* | 2/2024 | Anzenberg | G06V 30/413 |
| 2024/0145050 | A1 | 5/2024 | Thompson, IV et al. | |
| 2024/0169251 | A1* | 5/2024 | Herard | G06N 3/0455 |
| 2024/0177706 | A1* | 5/2024 | Tripathi | G10L 15/10 |
| 2024/0289629 | A1* | 8/2024 | Wang | G06N 3/08 |
| 2024/0346364 | A1* | 10/2024 | Araki | G06F 40/284 |
| 2024/0346371 | A1* | 10/2024 | Majumdar | G06N 3/08 |
| 2024/0354642 | A1* | 10/2024 | Gopalkrishna | G06N 3/08 |
| 2024/0370517 | A1* | 11/2024 | DeVos | G06F 40/30 |
| 2024/0370779 | A1* | 11/2024 | Neelakantan | G06N 3/045 |
| 2024/0420017 | A1* | 12/2024 | Laradji | G06N 20/00 |
| 2025/0000425 | A1* | 1/2025 | Zeng | A61B 5/369 |
| 2025/0077775 | A1* | 3/2025 | Deng | G06F 40/56 |
| 2025/0077792 | A1* | 3/2025 | Chen | G06N 3/045 |
| 2025/0094718 | A1* | 3/2025 | Yan | G06F 40/30 |
| 2025/0124026 | A1* | 4/2025 | Cheng | G06F 40/40 |
| 2025/0131694 | A1* | 4/2025 | Iscen | G06V 10/761 |
| 2025/0258852 | A1* | 8/2025 | Crabtree | G06F 16/3344 |
| 2025/0335215 | A1* | 10/2025 | Saeedi | G06F 40/20 |

* cited by examiner

AUTOMATED LANGUAGE MODEL-BASED TRAINING FRAMEWORK FOR MACHINE LEARNING CLASSIFIERS

BACKGROUND

Traditionally, language model architectures are applied to text and other data elements to perform retrieval tasks for different computer processes, such as query processing, data clustering, and/or the like. While accurate, the use of such models is computationally intensive, time-consuming, and expensive which makes traditional language model solutions ineffective for a number of use cases.

DETAILED DESCRIPTION

Figure 1:
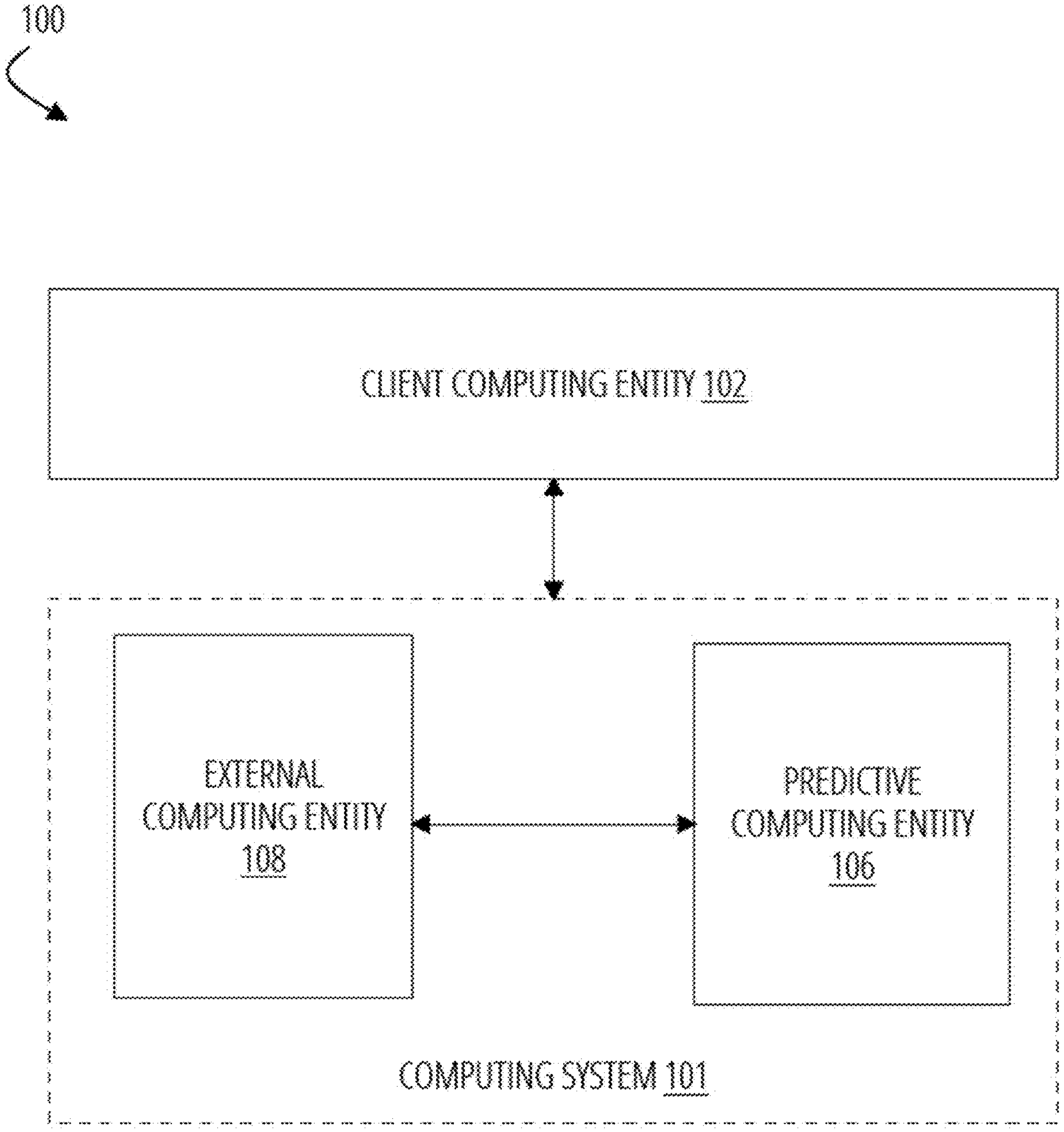
FIG. 1 depicts an example overview of an architecture in accordance with some embodiments of the present disclosure.

Various embodiments of the present disclosure provide a machine learning framework that transitions traditionally language modelling tasks to machine learning classifier tasks that are less resource intensive and faster than language models. To do so, the machine learning framework comprises two stages, a first, language model encoding stage and a second, classifier training stage, that collectively synthesize performance efficiencies of both language and traditional classifier models For example, in the first stage, a language model is leverage to generate a training data set for a classifier by encoding a set of data element and automatically assigning pseudo-labels to the set of data elements based on their embeddings. In the second stage, a classifier is trained using the pseudo-labelled data to replicate the performance of a language model. In this manner, the machine learning framework provides an automated solution to several technical challenges with language models, namely their expense, time consumption, and lack of explainability, by training less computationally expensive, time intensive, and more explainable classifier models to mimic their outputs. At the same time, the machine learning framework avoids challenges with classifier models, namely the need for labeled training data, by leveraging a language model and automated labeling technique to automate the generation of supervised training data that is sufficient to replicate the performance of the language model. Ultimately, the machine learning framework provides a technical improvement to the art of machine learning though a new arrangement of machine learning architectures that integrates the performance efficiencies of different architectures, while overcoming various challenges with each.

In some embodiments, the machine learning framework is applied to large datasets to improve both data filtering and machine learning training functionalities of a computer. For example, and as described herein, the machine learning framework may leverage embedding and pseudo-labeling techniques at a first stage to preemptively reduce a data space and/or improve training for one or more subsequent machine learning stages of a machine learning pipeline. By doing so, the multi-staged machine learning framework may improve the performance of one or more downstream machine learning models that enables the adaptation of traditionally underperforming machine learning models to a particular computing task. This, in turn, enables improved extraction of relevant data elements from a large dataset that, unlike traditional techniques, may handle a data space of any size for a dataset without reductions in accuracy. Moreover, the machine learning framework may enable repeated execution of a computing tasks and/or one or more other related computing tasks without requiring retraining of a machine learning model for a particular computing domain.

In some embodiments, the machine learning framework is applied to large dataset to enable real-time processing of a request (e.g., a query) by reducing an amount of time required for processing complex data associated with high-dimensional categorical feature spaces and/or a high degree of cardinality within a dataset. In this way, the multi-staged machine learning framework may provide more accurate machine learning output via improved machine learning that addresses various technical deficiencies of traditional machine learning systems. When implemented in connection with a user interface, the multi-staged machine learning framework enables an improved user interface that may be leveraged to automate various computer-based tasks. In some embodiments, the multi-staged machine learning framework enables efficient and reliable processing of user interface workflows in real time while also providing efficient and reliable visualizations related to machine learning results via a user interface. In some embodiments, a user interface workflow and/or a user interface request initiated via a user interface may be resolved in a shorter amount of time and/or by utilizing fewer computing resources as compared to traditional user interfaces. Additionally, or alternatively, visualizations related to the user interface may be rendered in a shorter amount of time and/or by utilizing fewer computing resources as compared to traditional user interfaces.

In one practical example, using a healthcare technology domain for illustration, the machine learning framework may provide improved machine learning training to configure a classifier model for cohort creation related to multiple clinical entities. In some embodiments, the machine learning framework may provide improved machine learning training to enable extraction of a cohort of clinical notes related to a clinical entity from a collection of clinical notes by computing embeddings for a corpus of clinical notes and clinical entities using an encoder language model, comparing an embedding for a particular clinical entity with respective embeddings associated with the corpus of clinical notes based on a similarity threshold to determine a cohort of clinical notes related to the particular clinical entity, training a classifier model based on the cohort of clinical notes, and/or filtering the cohort of clinical notes based on the classifier model.

Examples of technologically advantageous embodiments of the present disclosure include improved: (i) improved machine learning systems, (ii) improved training datasets for a machine learning model, (iii) improved performance for a classifier model by utilizing an optimized training dataset generated using an encoder language model, (iv) improved data embedding techniques for a machine learning model, (v) improved user interfaces and/or data visualizations by optimizing a data object for a rendering of a data visualization via a user interface, (vi) improved transmission of visual data over a network to append machine learning information to digital data, (vii) a distributed network architecture operating in connection with a machine learning framework to reduce network congestion while generating data element records, (viii) improved distribution of machine learning functionality within a network to filter data elements for an entity identifier, (iv) a specific user interface and implementation for navigating the user interface to consume machine learning output via improved computer-based techniques, among other aspects of the present disclosure. Other technical improvements and advantages may be realized by one of ordinary skill in the art.

I. OVERVIEW OF EMBODIMENTS

As should be appreciated, various embodiments of the present disclosure may be implemented as methods, apparatus, systems, computing devices, computing entities, computer program products, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 depicts an example overview of an architecture 100 in accordance with some embodiments of the present disclosure. The architecture 100 comprises a computing system 101 configured to receive a request, such as a user interface request, a computing tasks request, a machine learning request, a model prompt request, a query, and/or the like, from client computing entities 102, process the request, and provide one or more responses, such as model output, machine learning output, a data visualization, a user interface overlay, one or more graphical elements, and/or the like to the client computing entities 102. The example architecture 100 may be used in a plurality of domains and not limited to any specific application as disclosed herewith. The plurality of domains may comprise healthcare, industrial, manufacturing, computer security, and/or the like to name a few.

In accordance with various embodiments of the present disclosure, one or more machine learned models may be trained to generate candidate outputs, candidate output scores, and/or other machine learned outputs. The models may be adapted to a differential request handling engine and/or complementary scoring mechanism that may collectively process a request using data scaling and/or data pre-processing. Some techniques of the present disclosure may adapt traditional models to a cohesive modeling framework for more efficiently handling portions of the request handling process.

In some embodiments, the computing system 101 communicates with at least one of the client computing entities 102 using one or more communication networks. Examples of communication networks comprise any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may comprise a predictive computing entity 106 and one or more external computing entities 108. The predictive computing entity 106 and/or one or more external computing entities 108 may be individually and/or collectively configured to receive requests from client computing entities 102, process the requests to generate code predictions, and provide the code predictions to the client computing entities 102.

For example, as discussed in further detail herein, the predictive computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data processing and/or training tasks. The storage subsystem may comprise one or more storage units, such as multiple distributed storage units that are connected through a computer network. A storage unit in the respective computing entities may store at least one of one or more data assets and/or a set of data about the computed properties of one or more data assets. Moreover, each storage unit in the storage systems may comprise one or more non-volatile storage or volatile storage media similar to or different than the non-volatile and/or volatile computer-readable storage media discussed above.

In some embodiments, the predictive computing entity 106 and/or one or more external computing entities 108 are communicatively coupled using one or more wired and/or wireless communication techniques. The respective computing entities may be configured according to the techniques described herein to perform one or more operations of one or more techniques described herein. By way of example, the predictive computing entity 106 may be configured to train, implement, use (e.g., execute an inference operation(s)), update (e.g., fine-tune), and evaluate multi-level regression models in accordance with one or more training and/or inference operations of the present disclosure. In some examples, the external computing entities 108 may be configured to train, implement, use, update, and evaluate multi-level regression models in accordance with one or more training and/or inference operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., request handling, multi-level regression modeling techniques scoring techniques, etc.) described herein. The external computing entities 108, for example, may comprise and/or be associated with one or more entities that may be configured to receive, transmit, store, manage, and/or facilitate datasets, and/or the like. The external computing entities 108, for example, may comprise data sources that may provide such datasets, and/or the like to the predictive computing entity 106 which may leverage the datasets, such as one or more recorded entity cohorts and/or the like, to perform one or more steps/operations of the present disclosure, as described herein. In some examples, the datasets may comprise an aggregation of data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for an information domain.

In some example embodiments, the predictive computing entity 106 may be configured to receive a trained model trained and subsequently provided by the one or more external computing entities 108. For example, the one or more external computing entities 108 may be configured to perform one or more training steps/operations of the present disclosure to train a model, as described herein. In such a case, the trained model may be provided to the predictive computing entity 106, which may leverage the trained model to perform one or more inference steps/operations of the present disclosure. In some examples, feedback (e.g., evaluation data, ground truth data) from the use of the model may be received and/or stored by the predictive computing entity 106. In some examples, the feedback may be provided to the one or more external computing entities 108 to continuously train the model over time. In some examples, the feedback may be leveraged by the predictive computing entity 106 to continuously train the model over time. In this manner, the computing system 101 may perform, via one or more combinations of computing entities, one or more prediction, training, and/or any other modeling techniques of the present disclosure.

A. Example Predictive Computing Entity

Figure 2:
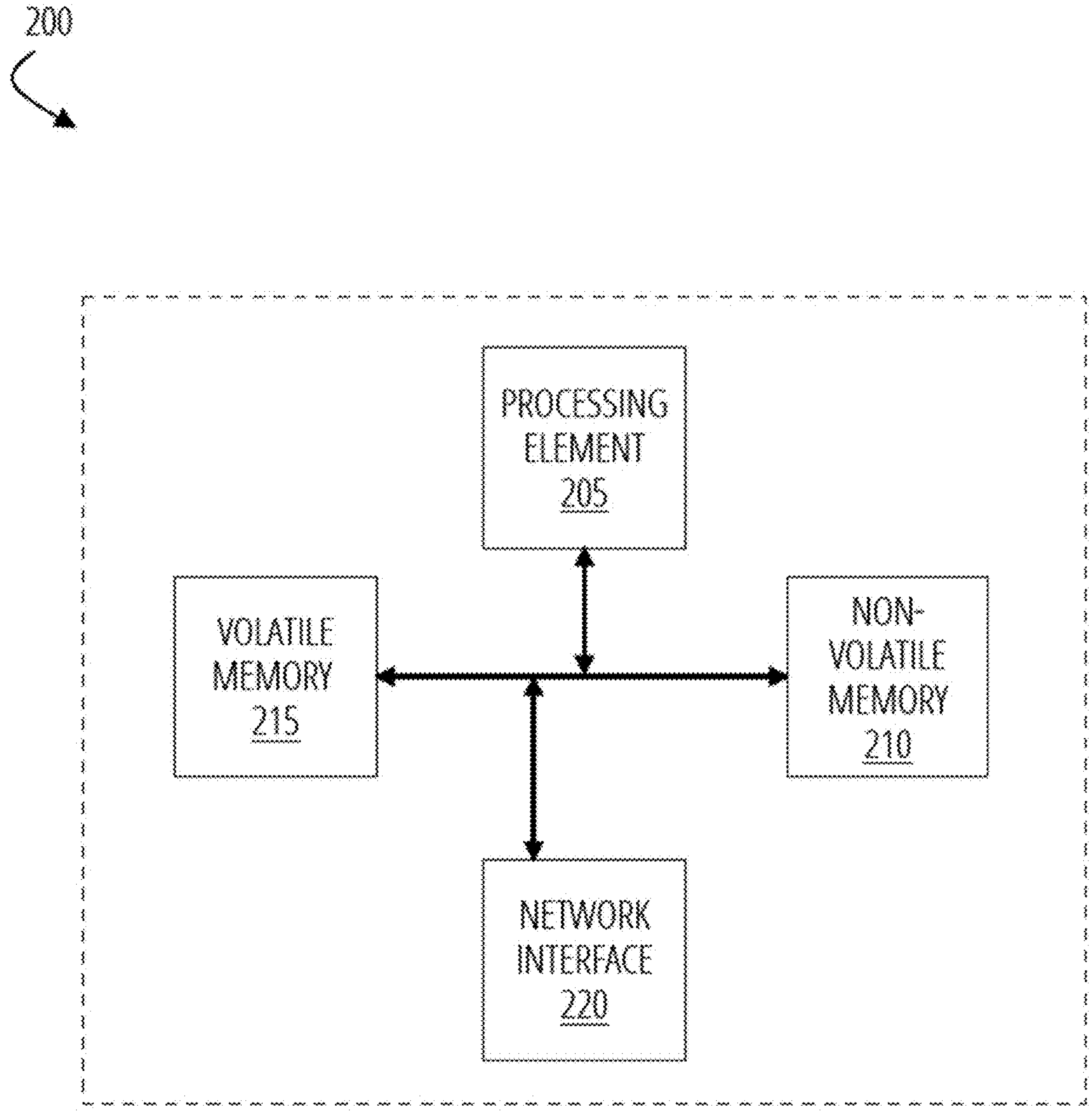
FIG. 2 depicts an example predictive data analysis computing entity in accordance with some embodiments of the present disclosure.

FIG. 2 depicts an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may comprise, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive computing entity 106) may train and use one or more machine learning models described herein. In other embodiments, a first computing entity (e.g., predictive computing entity 106, which may be one or more predictive computing entities) may use one or more machine learning models that may be trained by a second computing entity (e.g., external computing entity 108) communicatively coupled to the first computing entity. The second computing entity, for example, may train one or more of the machine learning models described herein, and subsequently provide the trained machine learning model(s) (e.g., optimized weights, code sets) to the first computing entity over a network.

As shown in FIG. 2, in some embodiments, the computing entity 200 may comprise, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, arithmetic logic units (ALUs) (e.g., which may be part of one or more graphics processing units (GPUs), tensor processing units (TPUs), and/or the like), coprocessing entities, application-specific instruction-set processors (ASIPs), microcontrollers, and/or controllers. Additionally, or alternatively, the processing element 205 may be embodied as one or more other processing devices and/or circuitry. The term circuitry may refer to an entirely hardware embodiment or a combination of hardware and computer program products. Examples of a combination of hardware and computer program products comprise application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further comprise, or be in communication with, non-transitory computer readable media, such as non-volatile memory 210 (also referred to as non-volatile media, storage, memory storage, memory circuitry, and/or similar terms used herein interchangeably) and/or volatile memory 215 (also referred to as volatile media, storage, memory storage, memory circuitry, and/or similar terms used herein interchangeably), as discussed above.

In some embodiments, non-volatile memory 210 may comprise a computer-readable storage medium may comprise a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also comprise a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also comprise read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also comprise conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, volatile memory 215 may comprise a computer-readable storage medium including random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As will be recognized, the non-volatile memory 210 and/or the volatile memory 215 may store respective part(s) of one or more databases, database instances, database management systems, data, applications, programs, program modules, scripts, code (e.g., source code, object code, byte code, compiled code, interpreted code, machine code) that embodies one or more machine learning models or other computer functions described herein, executable instructions, and/or the like being executed by, for example, the processing element 205. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 by operating the processing element 205 according to software component(s) retrieved from any of the computer-readable storage media and executed by the processing element 205.

Embodiments of the present disclosure may be implemented in various ways, including as computer program products that comprise articles of manufacture. Such computer program products may comprise one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages comprise, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form, such as object code, or may be first transformed into another form, such as by compiling source code. A software component may be stored as a file or other data storage construct. Software components of a similar type or functionally related may be stored together such as in a particular directory, folder, or library. Software components may be static (e.g., pre-established, or fixed) or dynamic (e.g., created or modified at the time of execution).

A computer program product may comprise a non-transitory computer-readable storage medium storing one or more software components comprising application(s), program(s), program module(s), script(s), source code and/or compiler(s) for generating executable instructions such as object code using the source code, program code, object code, byte code, compiled code, interpreted code, machine code, executable instructions, and/or the like (e.g., executable instructions, instructions for execution, computer program products, program code, and/or similar terms used herein interchangeably). Such non-transitory computer-readable storage media comprise all computer-readable storage media (including volatile memory 215 and non-volatile memory 210). In some embodiments, the computer program product may be executed by the computing entity 200 and/or the client computing entity. For example, at least a first portion of the computer program product may be stored within the volatile memory 215 and/or non-volatile 210 of the computing entity 200. In addition, or alternatively, at least a second portion of the computer program product may be stored within the volatile and/or non-volatile memory of a client computing entity.

As indicated, in some embodiments, the computing entity 200 may also comprise one or more network interfaces 220 for communicating with various computing entities (e.g., the client computing entity 102, external computing entities), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, IEEE 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may in addition or alternatively comprise, or be in communication with, one or more input elements/devices, such as input sensor(s). In some examples, the input sensor(s) may comprise one or more keyboards, pointing devices (e.g., mouse, trackpad), touch screens, cameras (e.g., infrared light camera, visual light camera), depth sensors (e.g., LIDAR, radar, stereo cameras), gyroscopes, location sensors (e.g., global positioning system (GPS), Hall effect sensor, laser doppler vibrometer), microphones, and/or the like. The computing entity 200 may in addition or alternatively comprise, or be in communication with, one or more output elements/devices (not shown), such as one or more speakers, visual display devices, haptic feedback devices, motion devices (e.g., electromechanically actuated devices), and/or the like.

B. Example Client Computing Entity

Figure 3:
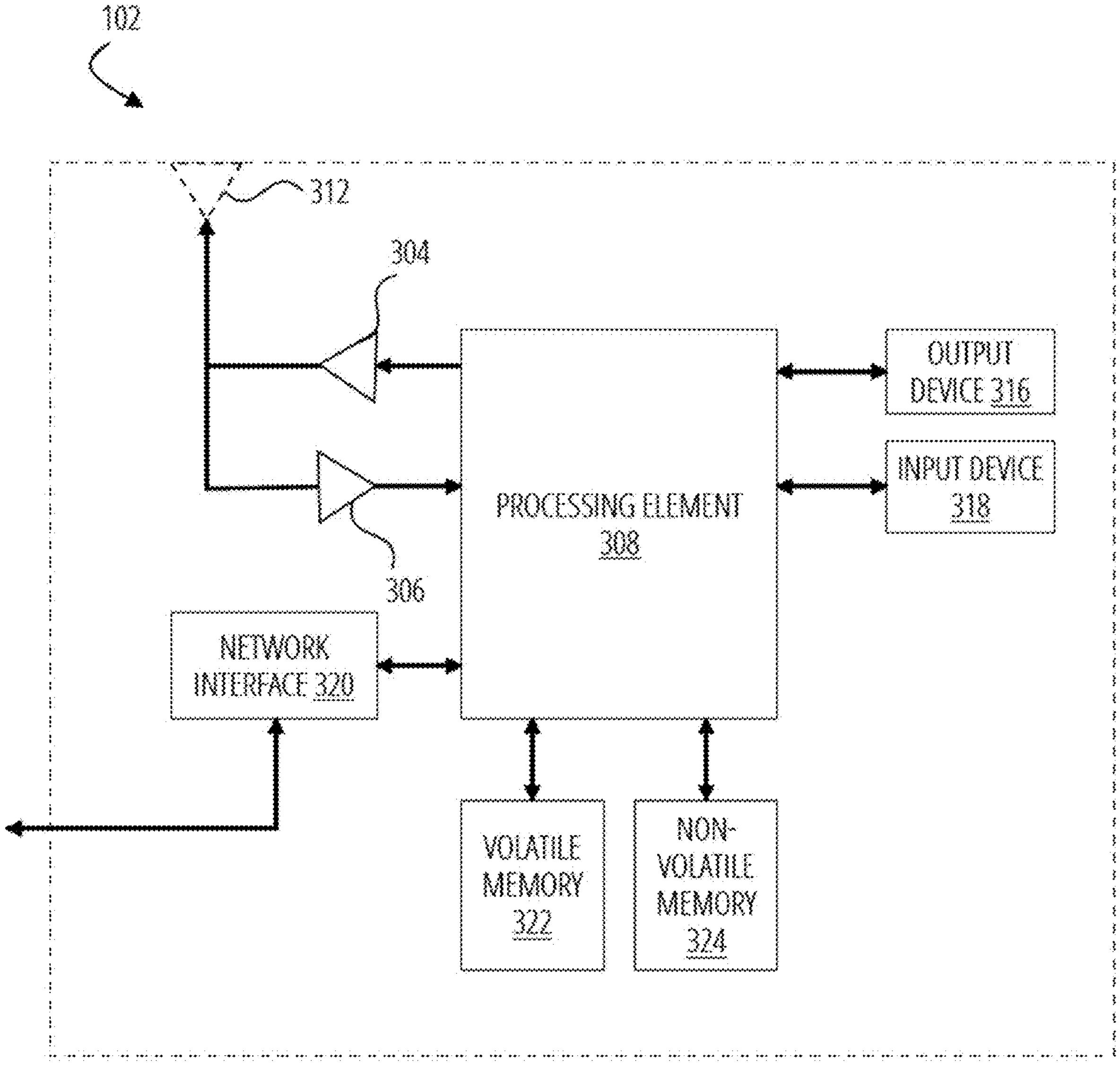
FIG. 3 depicts an example client computing entity in accordance with some embodiments of the present disclosure.

FIG. 3 depicts an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may comprise an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may comprise signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with one or more wireless and/or wired communication standards and protocols, such as those described above with regard to the computing entity 200.

The client computing entity 102 may in addition or alternatively download code, changes, add-ons, and updates, for instance, to its firmware, software (e.g., including executable instructions, applications, program modules), and operating system.

According to some embodiments, the client computing entity 102 may comprise location determining aspects, devices, modules, functionalities, and/or similar words used herein interchangeably. For example, the client computing entity 102 may comprise outdoor positioning aspects, such as a location component adapted to acquire, for example, latitude, longitude, altitude, geocode, course, direction, heading, speed, universal time (UTC), date, and/or various other information/data. In some embodiments, the location component may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may comprise indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may comprise the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface that may comprise an output device 316 coupled to a processing element 308 and/or a user input device 318 coupled to the processing element 308. An output device 316, for example, may comprise a hardware computing device comprising one or more output elements (not shown), such as one or more speakers, visual display devices, haptic feedback devices, motion devices (e.g., electromechanically actuated devices), and/or the like. A user input device 318 may comprise the same or different hardware computing device comprising one or more input elements (not shown), such as keyboards, pointing devices (e.g., mouse, trackpad), touch screens, cameras (e.g., infrared light camera, visual light camera), depth sensors (e.g., LIDAR, radar, stereo cameras), gyroscopes, location sensors (e.g., global positioning system (GPS), Hall effect sensor, laser doppler vibrometer), microphones, and/or the like.

In some examples, the user interface may in addition or alternatively comprise software component(s) executed by the processing element 308 to present (e.g., audibly, visually, tactilely) via a user input device 318 and/or output device 316 and/or a software endpoint such as an application programming interface (API) or exposed software function a graphical user interface (GUI) (e.g., at least a portion of a user application, browser), command-line interface, touch and/or haptic user interface, gesture and/or image capture-based interface, voice/audio user interface, and/or the like used herein interchangeably executing on and/or accessible via the client computing entity 102 to interact with and/or cause display of information/data from the computing entity 200, as described herein. In addition to providing input, the user input interface may be used, for example, to activate, deactivate, and/or modify certain functions, such as altering a power or operating state of the client computing entity 102, the computing system 101, the predictive computing entity 106, and/or the external computing entity 108.

The client computing entity 102 may further comprise, or be in communication with, one or more memory components, such as the volatile memory 322 and/or non-volatile memory 324. For example, the memory components may comprise non-transitory computer readable media, such as non-volatile memory 324 (also referred to as non-volatile storage, memory, memory storage, memory circuitry, and/or similar terms used herein interchangeably) and/or volatile memory 322 (also referred to as volatile storage, memory, memory storage, memory circuitry, and/or similar terms used herein interchangeably), as discussed above with reference to FIG. 2.

As will be recognized, the non-volatile memory 324 and/or the volatile memory 322 may store respective part(s) of one or more databases, database instances, database management systems, data, applications, programs, program modules, scripts, code (e.g., source code, object code, byte code, compiled code, interpreted code, machine code) that embodies one or more machine learning models or other computer functions described herein, executable instructions, and/or the like being executed by, for example, the processing element 308. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In another embodiment, the client computing entity 102 may comprise one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity (e.g., an intelligent agent machine-learned model), such as AutoGPT, Mycroft, Rhasspy, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage component, and/or accessible over a network. In various embodiments, the AI computing entity may be configured to retrieve and/or execute one or more of the predefined program algorithms upon the occurrence of a predefined trigger event.

III. EXAMPLE SYSTEM OPERATIONS

As indicated, various embodiments of the present disclosure make important technical contributions to optimizing machine learning systems by providing an automated language model-based training framework for machine learning classifiers. In various embodiments, a machine learning architecture that improves the functionality of a computer and/or a machine learning model with respect to extracting relevant data elements from a vast dataset for a computing task is provided. In various embodiments, a multi-staged machine learning framework provides complementary machine learning stages to extract relevant data elements from a vast dataset for a computing task with less computing resources as compared to traditional machine learning techniques. To overcome performance deficiencies with traditional machine learning techniques, the multi-staged machine learning framework utilizes embedding techniques for a machine learning stage of a machine learning pipeline to preemptively reduce a data space and/or improve training for one or more subsequent machine learning stages of the machine learning pipeline. By doing so, the multi-staged machine learning framework may improve the performance of one or more downstream machine learning models that enables the adaptation of traditionally underperforming machine learning models to a particular computing task. This, in turn, enables improved extraction of relevant data elements from a vast dataset that, unlike traditional techniques, may handle a data space of any size for a dataset without reductions in accuracy. Additionally, the multi-staged machine learning framework may enable repeated execution of a computing tasks and/or one or more other related computing tasks without requiring retraining of a machine learning model for a particular computing domain.

Figure 4:
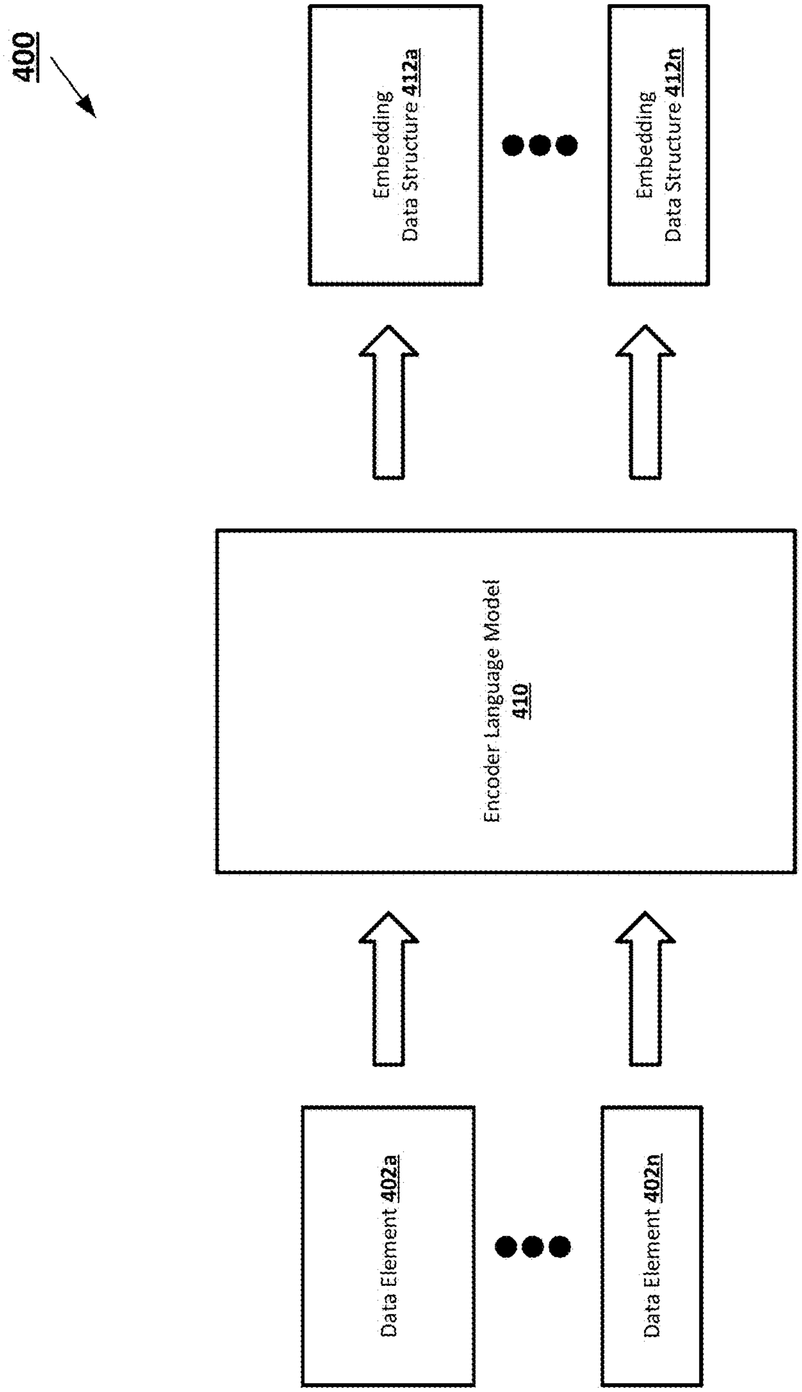
FIG. 4 depicts a dataflow diagram showing example data structures, modules, and/or pipelines for generating embedding data structures in accordance with some embodiments of the present disclosure.

FIG. 4 depicts a dataflow diagram 400 showing example data structures, modules, and/or pipelines for generating embedding data structures in accordance with some embodiments discussed herein. In some embodiments, the dataflow diagram 400 provides a stage for a multi-staged machine learning framework to preemptively reduce a data space and/or improve training for one or more subsequent machine learning stages. In some embodiments, the dataflow diagram 400 may utilize preprocessing and/or data chunking related to a retrieval-augmented generation (RAG) technique to enable a machine learning task for generating embedding data structures.

The dataflow diagram 400 comprises an encoder language model 410. In some embodiments, the computing system 101 utilizes the encoder language model 410 to generate a set of embedding data structures 412*a-n* from a set of data elements 402*a-n*. For example, the computing system 101 may utilize the encoder language model 410 to generate at least an embedding data structure 412*a* for a data element 402*a* of the set of data elements 402*a-n*. The encoder language model 410 may be a data entity that describes parameters, hyperparameters, and/or defined operations of a rules-based and/or machine learned model (e.g., model including at least one of one or more rule-based layers, one or more layers that depend on trained parameters, coefficients, and/or the like). In some embodiments, the encoder language model 410 may be a machine learning embedding model. For example, the encoder language model 410 may include one or more encoder language models configured, trained (e.g., jointly, separately, etc.), and/or the like to encode one or more data elements into one or more embeddings data structures. The encoder language model 410 may include one or more of any type of machine learned model including one or more supervised, unsupervised, semi-supervised, reinforcement learning models, and/or the like. In some embodiments, the encoder language model 410 may include multiple models configured to perform one or more different stages of an embedding process.

In some embodiments, the encoder language model 410 may be trained to factorize one or more inputs, such as one or more text strings associated with a data element, to generate an embedding data structure. In some examples, the encoder language model 410 may be trained such that a latent space of the encoder language model 410 is representative of certain semantic domains/contexts, such as an entity identifier domain and/or a clinical domain. In some embodiments, the encoder language model 410 may be trained to generate embedding data structures representative of one or more learned (and/or prescribed, etc.) relationships between one or more words, phrases, and/or sentences. By way of example, the encoder language model 410 may represent a semantic meaning of a word and/or sentence differently in relation to other words and/or sentences, and/or the like. The encoder language model 410 may include any type of encoder language model finetuned on information for a particular domain. By way of example, the encoder language model 410 may include one or more of bi-directional encoder representations from transformers ("BERT"), sentence BERT ("SBERT"), ClinicalBERT, Word2Vec, global vectors for word representation ("GloVe"), Doc2Vec, InferSent, Universal Sentence Encoder, and/or the like. In some examples, the encoder language model 410 may be finetuned on a domain-specific dataset, such as a plurality of historical prompts. In some embodiments, the encoder language model 410 may be fine tuned using a set of labeled data elements corresponding to the set of data elements 402*a-n*. In some embodiments, a labeled data element of the set of labeled data elements may comprise a data element and a binary label that identifies a presence or absence of a particular entity identifier within the data element.

In some embodiments, the computing system 101 may generate the set of data elements 402*a-n* from one or more input data object by parsing an input data object of a set of input data objects in accordance with a combined set of data chunking and context rules. In some embodiments, the combined set of data chunking and context rules enable formatting and/or sizing of an embedding data structure for the encoder language model 410 in accordance with a type of domain for a corresponding data element for the embedding data structure. In some embodiments, the combined set of data chunking and context rules additionally or alternatively enable formatting and/or sizing of an embedding data structure for another model (e.g., a machine learned entity classifier model) associated with one or more subsequent machine learning stages of the multi-staged machine learning framework.

In some embodiments, an embedding data structure of the set of embedding data structures 412*a-n* is a data entity that describes a vector representation of information associated with a corresponding data element 402*a-n*. An embedding data structure of the set of embedding data structures 412*a-n* may be a fixed-length vector that represents words and/or sentences within a data element. By way of example, an embedding data structure of the set of embedding data structures 412*a-n* may include a vectorized representation of a text associated with a corresponding data element 402*a-n*. In some embodiments, the computing system 101 may store the set of embedding data structures 412*a-n* for the set of data elements 402*a-n* in a vector database in accordance with a set of clustering rules for the vector database. For example, the set of clustering rules may group embedding data structures in accordance with similarity criteria associated with a particular entity identifier and/or a particular computing domain.

Figure 5:
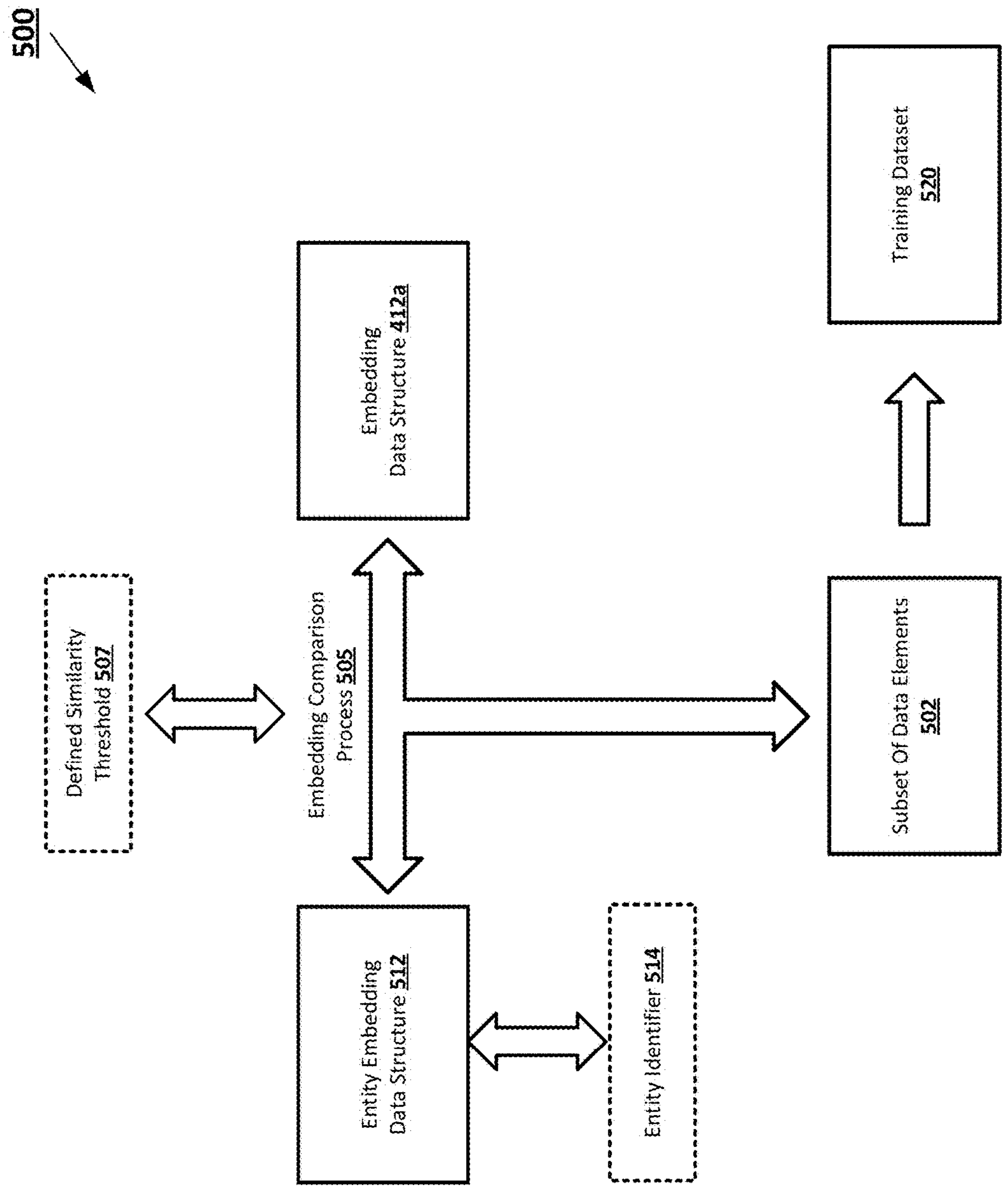
FIG. 5 depicts a dataflow diagram showing example data structures, modules, and/or pipelines for generating a training dataset for a machine learned model in accordance with some embodiments of the present disclosure.

FIG. 5 depicts a dataflow diagram 500 showing example data structures, modules, and/or pipelines for generating a training dataset for a machine learned model in accordance with some embodiments discussed herein. In some embodiments, the dataflow diagram 500 provides a training stage for a multi-staged machine learning framework to preemptively reduce a data space and/or improve training for one or more subsequent learned models.

In some embodiments, the computing system 101 performs an embedding comparison process 505. For example, the computing system 101 may perform the embedding comparison process 505 to determine a subset of data elements 502 for an entity identifier 514 and from the set of data elements 402*a-n*. In some embodiments, the computing system 101 may determine the subset of data elements 502 based on an embedding similarity score between the embedding data structure 412*a* and an entity embedding data structure 512 corresponding to the entity identifier 514. Additionally, the computing system 101 may determine the subset of data elements 502 based on a defined similarity threshold 507. For example, the computing system 101 may compare the entity embedding data structure 512 to the embedding data structure 412*a* based on the defined similarity threshold 507 to determine the subset of data elements 502 related to the entity identifier 514. In some embodiments, a value of the defined similarity threshold 507 is based on a Gaussian distribution of similarity scores for historical comparisons of embedding data structures. For example, the computing system 101 may configure a value of the defined similarity threshold 507 based on a probability distribution with respect to mean of similarity scores for historical comparisons of embedding data structures. In some embodiments, the computing system 101 may query a vector database that comprises the set of embedding data structures 412*a-n* to enable the comparison between the embedding data structure 412*a* and the entity embedding data structure 512.

In some embodiments, the entity identifier 514 is a data entity that identifies an entity associated with data and/or one or more data elements. In some embodiments, the entity identifier 514 provides a link between various data points and/or attributes for an entity across different data structures and/or different data elements of the set of data elements 402*a-n*. In a healthcare domain, the entity identifier 514 may be a patient identifier that corresponds to a patient and/or patient information associated with one or more data elements and/or one or more data sources. In some embodiments, the entity identifier 514 enables accurate synthesis of data from multiple sources and/or optimized application of model parameters to input data. In some embodiments, the entity identifier 514 enables formatting and/or configuration of input data for one or more modeling tasks associated with a model (e.g., a machine learned entity classifier model) utilized during one or more subsequent machine learning stages. In some embodiments, a search parameter corresponds to and/or includes the entity identifier 514.

In some embodiments, the entity identifier 514 is associated with term an entity attribute dataset. The entity attribute dataset may be a collection of data constructs that describes attributes and/or features for the entity identifier 514. In some embodiments, one or more portions of the entity attribute dataset may be obtained from an entity profile and/or an entity datastore. In some embodiments, the entity identifier 514 may be associated with a user device. For example, in some embodiments, the entity identifier 514 may be associated with user device information, user device location information, network address information, information included in a network data packet transmitted by a user device, and/or other information associated with a user device. In some embodiments, the entity identifier 514 may be a patient identifier or a member identifier. In an example, the entity attribute dataset may include one or more attributes such as, but not limited to, historical user behavior, historical medication behavior, census data, historical interaction patterns, domain attributes for a particular domain, and/or other user data.

In some embodiments, the computing system 101 may utilize the subset of data elements 502 to generate at least a portion of a training dataset 520. The training dataset 520 may be a data structure that includes one or more training data objects for a machine learned model. A training dataset may include any type (and any number) of data storage structures including, as examples, a feature set, a list of attributes, one or more linked lists, databases (e.g., relational databases, graph database, etc.), and/or the like. In some embodiments, the training dataset may include a labelled dataset for training of a machine learned model. The labelled dataset may include a plurality of training data objects that each include a label (e.g., ground truth) and training input (and/or data to derive a training input). In some embodiments, the training dataset 520 may be an input vector that is used to train a machine learned model. For example, the training dataset 520 may include an input vector that is associated with training data for a machine learned model. An input vector may include a vectorized representation of information that is engineered for a particular machine learned model. The information may include predictive features for improving the performance of the machine learned model. In some embodiments, the input vector may include a concatenation of one or more different vectors to form a comprehensive vector that may improve the performance of a machine learned model with respect to a particular task, such as computing task associated with the entity identifier 514. In some embodiments, the input vector may include a concatenation of one or more embedding data structures such as the entity embedding data structure 512 and the embedding data structure 412*a*. In this manner, the input vector may enable a machine learned model to learn relationships between textual features associated with a data element and user features associated with the entity identifier 514. In some embodiments, the embedding data structure 412*a* is a search embedding for a data request that includes a search parameter to be applied to the set of data elements 402*a-n*. In some embodiments, the training dataset 520 may be a training dataset that is configured for a machine learned entity classifier model for the entity identifier 514.

In some embodiments, the training dataset 520 comprises a first sample data element (a) labeled with a first pseudo label and (b) comprising a first sample embedding that aligns with the entity embedding data structure 512 in accordance with a threshold that is associated with a greater similarity than the defined similarity threshold 507. In some embodiments, the training dataset 520 additionally comprises a second sample data element (a) labeled with a second pseudo label and (b) comprising a second sample embedding that differs from the entity embedding data structure 512 in accordance with a threshold that is associated with a lesser similarity than the defined similarity threshold 507.

In some embodiments, the training dataset 520 comprises a positive training dataset and a negative training dataset. For example, a model such as a machine learned entity classifier model may be trained using supervised learning associated with the positive training dataset and the negative training dataset of the training dataset 520. In some embodiments, the subset of data elements 502 is a first subset of data elements that is determined from the set of data elements 402*a-n* based on a positive similarity threshold and corresponds to the positive training dataset. Additionally, the computing system 101 may determine a second subset of data elements for the entity identifier 514 and from the set of data elements 402*a-n* based on a negative similarity threshold and the embedding similarity score between the embedding data structure 412*a* and the entity embedding data structure 512 corresponding to the entity identifier 514. For example, the computing system 101 may further compare the entity embedding data structure 512 to the embedding data structure 412*a* based on the negative similarity threshold to determine at least a portion of the subset of data elements 502 related to the entity identifier 514. In some embodiments, the computing system 101 may generate the positive training dataset by sampling one or more positive data elements from the first subset of data elements and automatically assigning a pseudo-positive label to each of the one or more positive data elements. Additionally, the computing system 101 may generate the negative training dataset by sampling one or more negative data elements from the second subset of data elements and automatically assigning a pseudo-negative label to each of the one or more negative data elements.

Figure 6:
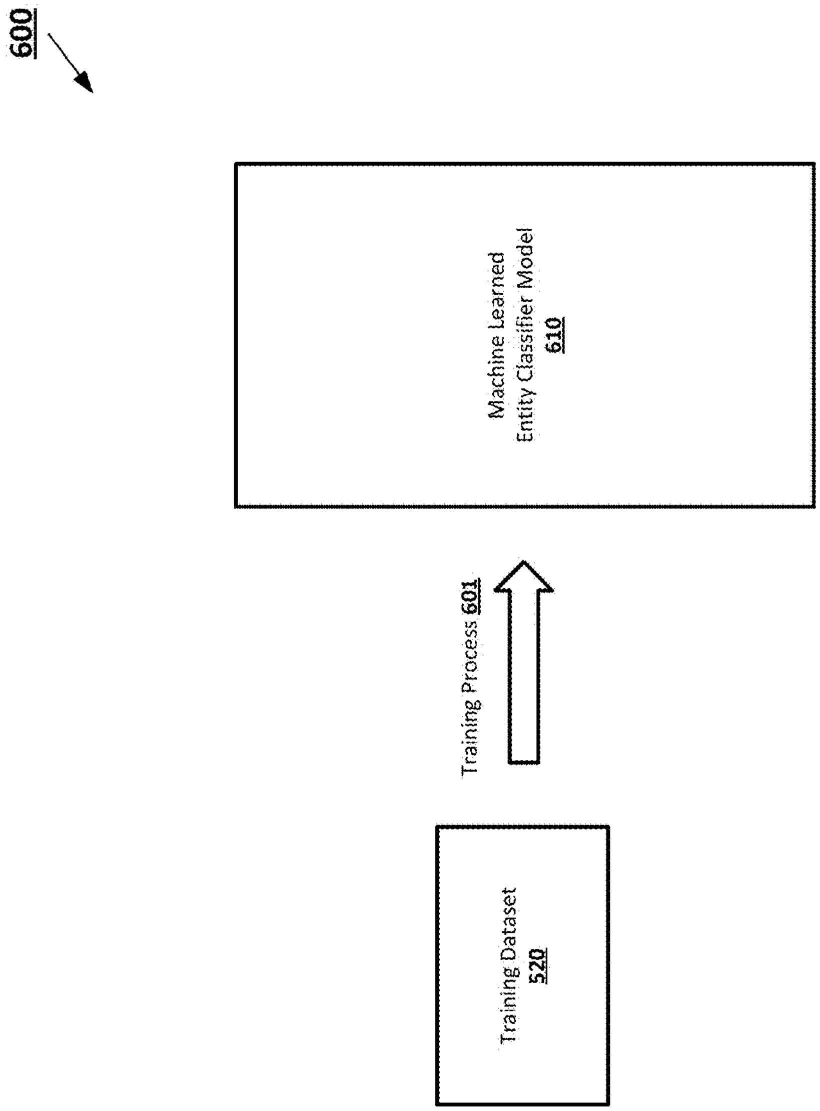
FIG. 6 depicts a dataflow diagram showing example data structures, modules, and/or pipelines for training a machine learned entity classifier model in accordance with some embodiments of the present disclosure.

FIG. 6 depicts a dataflow diagram 600 showing example data structures, modules, and/or pipelines for training a machine learned entity classifier model in accordance with some embodiments discussed herein. In some embodiments, the dataflow diagram 600 provides a training stage for a multi-staged machine learning framework to improve performance of the machine learned entity classifier model for a particular computing task.

The dataflow diagram 600 comprises a machine learned entity classifier model 610. In some embodiments the computing system 101 may train the machine learned entity classifier model 610 via a training process 601. For example, the computing system 101 may train the machine learned entity classifier model 610 based on the training dataset 520 to provide a trained version of the machine learned entity classifier model 610 for the entity identifier 514.

The machine learned entity classifier model 610 may be a hardware and/or software architecture having one or more parameters (e.g., coefficient(s), weight(s), biase(s), activation function(s) and/or action function type(s) in examples where the activation function and/or function type is determined as part of training, clustering centroid(s)/medoid(s), partition(s)) determined as a result of training the machine-learned model based at least in part on training hyperparameters and/or structural hyperparameters defining the model's architecture. In some examples, structural hyperparameter(s) may define component(s) of the model's architecture and/or their configuration/order, such as, for example, the configuration/order specifying which output(s) of one component are provided as input to other component(s); a number, type, and/or configuration of component(s) per layer, a number of layers of the model, a number of input nodes in an input layer of the model, a number of output nodes of an output layer of the model, component dimension (e.g., input size versus output size), temperature, and/or the like. The component(s) of the model may comprise one or more activation functions and/or activation function type(s) (e.g., gated linear unit (GLU), such as a rectified linear unit (ReLU), leaky RELU, Gaussian error linear unit (GELU), Swish, hyperbolic tangent), one or more attention mechanism and/or attention mechanism types (e.g., self-attention, cross-attention), and/or various other component(s) (e.g., adding and/or normalization layer, pooling layer, filter). Various combinations of any these components (as defined by the structural hyperparameter(s)) may result in different types of model architectures, such as a transformer-based machine-learned model (e.g., embedding model(s), generative pre-trained transformer(s) (GPT(s))), neural network(s), multi-layer perceptron(s), Kolmogorov-Arnold network(s), clustering algorithm(s), support vector machine(s), etc.

Additional or alternate hyperparameter(s) (i.e., training hyperparameter(s)) may be used as part of training the machine learned entity classifier model 610. In some examples, the training hyperparameter(s), in addition to the training data and/or input data, may affect determining the parameter(s) of the machine learned entity classifier model 610. Using a different set of training hyperparameters to train two machine-learned models that have the same architecture (i.e., the same structural hyperparameters) and using the same training data may result in the parameters of the first machine-learned model differing from the parameters of the second machine-learned model. Despite having the same architecture and having been trained using the same training data, such machine-learned models may generate different outputs from each other, given the same input data. Accordingly, accuracy, precision, recall, and/or bias may vary between such machine-learned models.

In some examples, training hyperparameter(s) may include a train-test split ratio, activation function and/or activation function type (e.g., in examples like KANs where the activation function type is determined as part of training from an available set of activation functions and/or limits on the activation function parameters specified by the training hyperparameters), training stage(s) (e.g., using a first set of hyperparameters for a first epoch of training, a second set of hyperparameters for a second epoch of training), a batch size and/or number of batches of data in a training epoch, a number of epochs of training, the loss function used (e.g., L1, L2, Huber, Cauchy, cross entropy), the component(s) of the machine-learned model that are altered using the loss for a particular batch or during a particular epoch of training (e.g., some components may be "frozen," meaning their parameters are not altered based on the loss), learning rate optimization algorithm type (e.g., gradient descent, adaptive, stochastic) used to determine an alteration to one or more parameters of one or more components of the machine learned entity classifier model 610 to reduce the loss determined by the loss function, and/or the like. In some examples, the structural hyperparameters and/or the training hyperparameters may be determined by a hyperparameter optimization algorithm or based on user input, such as a software component written by a user or generated by a machine-learned model. The machine learned entity classifier model 610 may include any type of model configured, trained, and/or the like to generate a refined subset of a set of data elements for an entity identifier. The machine learned entity classifier model 610 may include one or more of any type of machine learned model including one or more supervised, unsupervised, semi-supervised, and/or reinforcement learning models. In some embodiments, the machine learned entity classifier model 610 may include a single machine-learned model or multiple machine-learned model models configured to perform one or more different stages of a prediction process.

The machine learned entity classifier model 610 may be trained using the training dataset 520. In some embodiments, the machine learned entity classifier model 610 is a supervised machine learned model that is pre-trained using one or more supervisory and/or semi-supervised training techniques based on the training dataset 520, such as backpropagation of errors, and/or the like. In some examples, the labels may comprise partition(s), centroid(s) indicated by a user, class(es), k for use in supervised clustering algorithm training, a ground truth value, a ground truth classification, and/or the like. In an example where the machine learned entity classifier model 610 is a semi-supervised machine-learned model, the training dataset 520 may comprise previous input(s) to and/or previous output(s) generated by the machine learned entity classifier model 610 or another machine-learned model. The machine learned entity classifier model 610 may be trained based at least in part on providing a first training input of the set of training inputs to the machine learned entity classifier model 610, determining an output by the machine learned entity classifier model 610, determining a difference between the output and a first training output of the set of training outputs, determining a loss by a loss function based at least in part on the difference, and altering one or more parameters of the machine learned entity classifier model 610 to reduce the loss (e.g., using a loss optimization algorithm, such as gradient descent). In some examples, this process may be iteratively repeated for up to all of the inputs of the set of training inputs, respectively.

Figure 7:
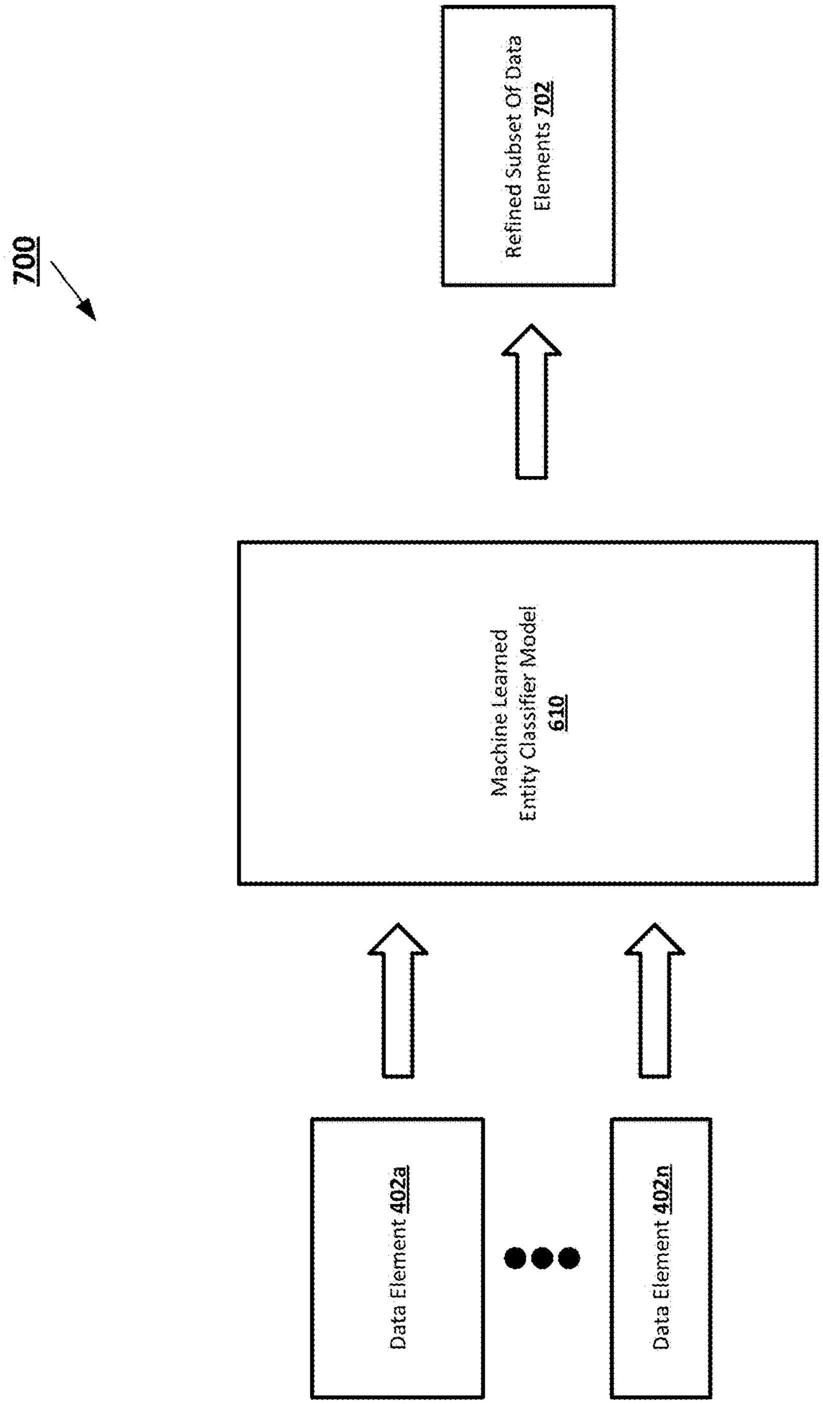
FIG. 7 depicts a dataflow diagram showing example data structures, modules, and/or pipelines for utilizing a trained machine learned entity classifier model in accordance with some embodiments of the present disclosure.

FIG. 7 depicts a dataflow diagram 700 showing example data structures, modules, and/or pipelines for utilizing a trained machine learned entity classifier model in accordance with some embodiments discussed herein. In some embodiments, the dataflow diagram 700 provides an inference stage for a multi-staged machine learning framework to improve machine learning output related to a particular computing task.

The dataflow diagram 700 comprises a trained version of the machine learned entity classifier model 610. In some embodiments the computing system 101 may apply the machine learned entity classifier model 610 to the set of data elements 402*a-n* to determine a refined subset of data elements 702 for the entity identifier 514. For example, the refined subset of data elements 702 may be a refined subset of the set of data elements 402*a-n*. In some embodiments, the refined subset of data elements 702 may be a filtered version of the subset of data elements 502. For example, the refined subset of data elements 702 may be a subset of data elements 402*a-n* for the entity identifier 514 that is more accurately correlated to the entity identifier 514 than the subset of data elements 502. As such, the refined subset of data elements 702 may be provided with higher precision than the subset of data elements 502.

Figure 8:
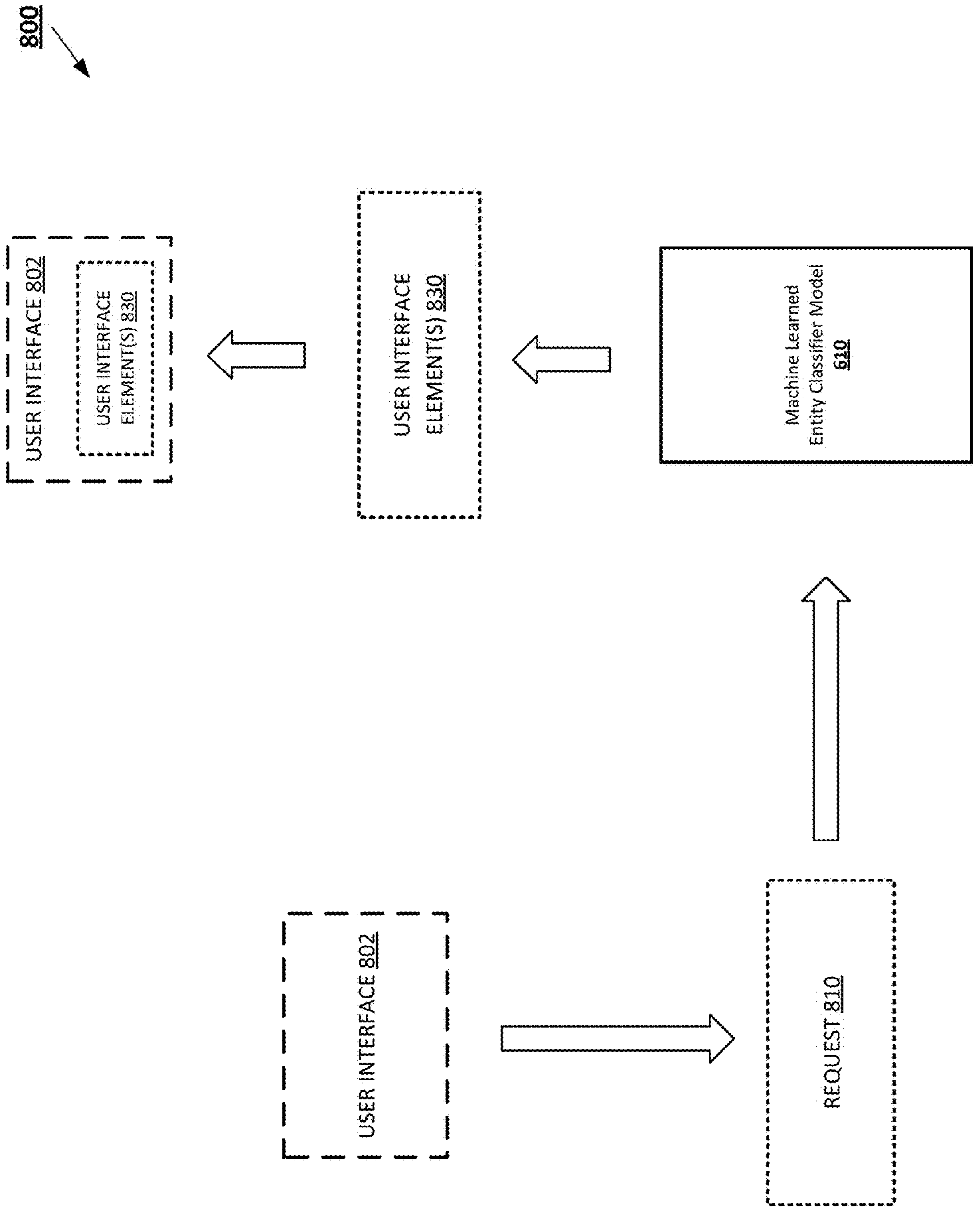
FIG. 8 depicts an interactive visualization system showing example devices, systems, engines, data structures, and/or processes for generating one or more user interface elements for rendering via a user interface in accordance with some embodiments of the present disclosure.

FIG. 8 depicts an interactive visualization system 800 showing example devices, systems, engines, data structures, and/or processes for generating one or more user interface elements for rendering via a user interface in accordance with some embodiments discussed herein. In some embodiments, the interactive visualization system 800 may enable real-time configuration of a user interface based on the refined subset of data elements 702. The interactive visualization system 800 may further enable a user to consume visual data and/or related insights associated with the entity group 406 in an interactive manner, where the visual data is tailored based on the refined subset of data elements 702.

In some embodiments, the interactive visualization system 800 comprises a user interface 802 of a user device. The user interface 802 may be an electronic interface for a web page, a mobile application, an electronic portal, a chatbot (e.g., an LLM-based chatbot), and/or the like. Additionally, a request 810 associated with the user interface 802 may be generated by the user device. For example, the request 810 may be a user interface request. In some embodiments, the request 810 may a query provided to a large language model. In some embodiments, the request 810 may be a data request that includes a search parameter to be applied to the set of data elements 402*a-n* and/or the set of embedding data structures 412*a-n* associated with the set of data elements 402*a-n*. In some embodiments, the user device may transmit the request 810 to the computing system 101 via a network. The network may be configured based on one or more wired and/or wireless communication protocols. For example, the network may provide communication executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 106 may be configured to communicate via wireless external communication using any of a variety of protocols, as further disclosed herein.

In some embodiments, the request 810 comprises character-level text input associated with a structured and/or natural language sequence of text (e.g., one or more alphanumeric characters, symbols, etc.). In some examples, the character-level text input may comprise user input, such as text input and/or text generated from one or more audio, tactile, and/or like inputs related to the user interface 802. In some examples, the character-level text input may comprise a natural language sequence of text provided via the user interface 802. In some examples, character-level text input may comprise a natural language sequence of text that expresses a question, preference, and/or the like. In addition or alternatively, the character-level text input may indicate a computing task domain associated with an entity identifier (e.g., the entity identifier 514) and/or a set of data elements (e.g., the set of data elements 402*a-n*).

In some embodiments, the request 810 may comprise or otherwise be associated with one or more request attributes such as a location attribute (e.g., a GPS position, a latitude/longitude, etc.) and/or the like. For example, the one or more request attributes may comprise user location data. The user location data may comprise a real-time location approximation associated with the user device, data (e.g., a GPS position, a latitude/longitude, etc.) provided by a location module of the user device, data associated with a network connection (e.g., a 5G connection, an internet protocol (IP) address, etc.) associated with the user device, data based on location text input provided by a user via the user interface 802, a geofence location associated with the user device, and/or other location data associated with the user device.

In some embodiments, the user location data comprises location information (e.g., a GPS position, a latitude/longitude, an address, a geofence location, etc.) associated with a user device and/or a user identifier. In some embodiments, the user location data is based on a location module of the user device. The location module may be adapted to acquire, for example, latitude, longitude, altitude, geocode, course, direction, heading, speed, UTC, date, and/or various other information/data. In one embodiment, the location module may acquire data, such as ephemeris data, by identifying the number of satellites in view and the relative positions of those satellites (e.g., using GPS). The satellites may be a variety of different satellites, comprising LEO satellite systems, DOD satellite systems, the European Union Galileo positioning systems, the Chinese Compass navigation systems, Indian Regional Navigational satellite systems, and/or the like. This data may be collected using a variety of coordinate systems, such as the DD; DMS; UTM; UPS coordinate systems; and/or the like. Alternatively, the location information/data may be determined by triangulating a position of the user device in connection with a variety of other systems, comprising cellular towers, Wi-Fi access points, and/or the like. In some embodiments, the location module may use various position or location technologies comprising RFID tags, indoor beacons or transmitters, Wi-Fi access points, cellular towers, nearby computing devices (e.g., smartphones, laptops), and/or the like. For instance, such technologies may comprise the iBeacons, Gimbal proximity beacons, BLE transmitters, NFC transmitters, and/or the like.

In some embodiments, the computing system 101 receives the request 810 via the network. In some embodiments, the computing system 101 utilizes the machine learned entity classifier model 610 to generate one or more user interface elements 830. In some embodiments, responsive to the request 810, the computing system 101 may initiate presentation of the one or more user interface elements 830 via the user interface 802. For example, the computing system 101 may initiate presentation of the one or more user interface elements 830 in real time or at least approximately in real time as compared to the request 810 being generated via the user interface 802 and/or received by the computing system 101. In some embodiments, the one or more user interface elements 830 may comprise a query response for the request 810.

In some embodiments, the one or more user interface elements 830 may be formatted to provide a visualization and/or human interpretation of data via the user interface 802. In some embodiments, the one or more user interface elements 830 and/or one or more computer-executable instructions associated therewith may be formatted for transmission via the network. For example, the one or more user interface elements 830 may be formatted for transmission via an API, a communication channel, a communication interface, or combinations thereof. In one or more embodiments, the one or more user interface elements 830 may be interacted with via the user interface 802.

In some embodiments, the computing system 101 transmits the one or more user interface elements 830 to the user device via the network. In some embodiments, the computing system 101 initiates a rendering of the one or more user interface elements 830 via the user interface 802 of the user device. In some embodiments, the one or more user interface elements 830 may be correlated to one or more other user interface elements displayed via the user interface 802. In some embodiments, an arrangement of the one or more user interface elements 830 may be optimally organized and/or presented via the user interface 802 to reduce a number of computing resources utilized by the user device for interacting with the one or more user interface elements 830. As such, an efficient and cost-effective user interface visualization may be provided for the user device by utilizing the computing system 101.

Figure 9:
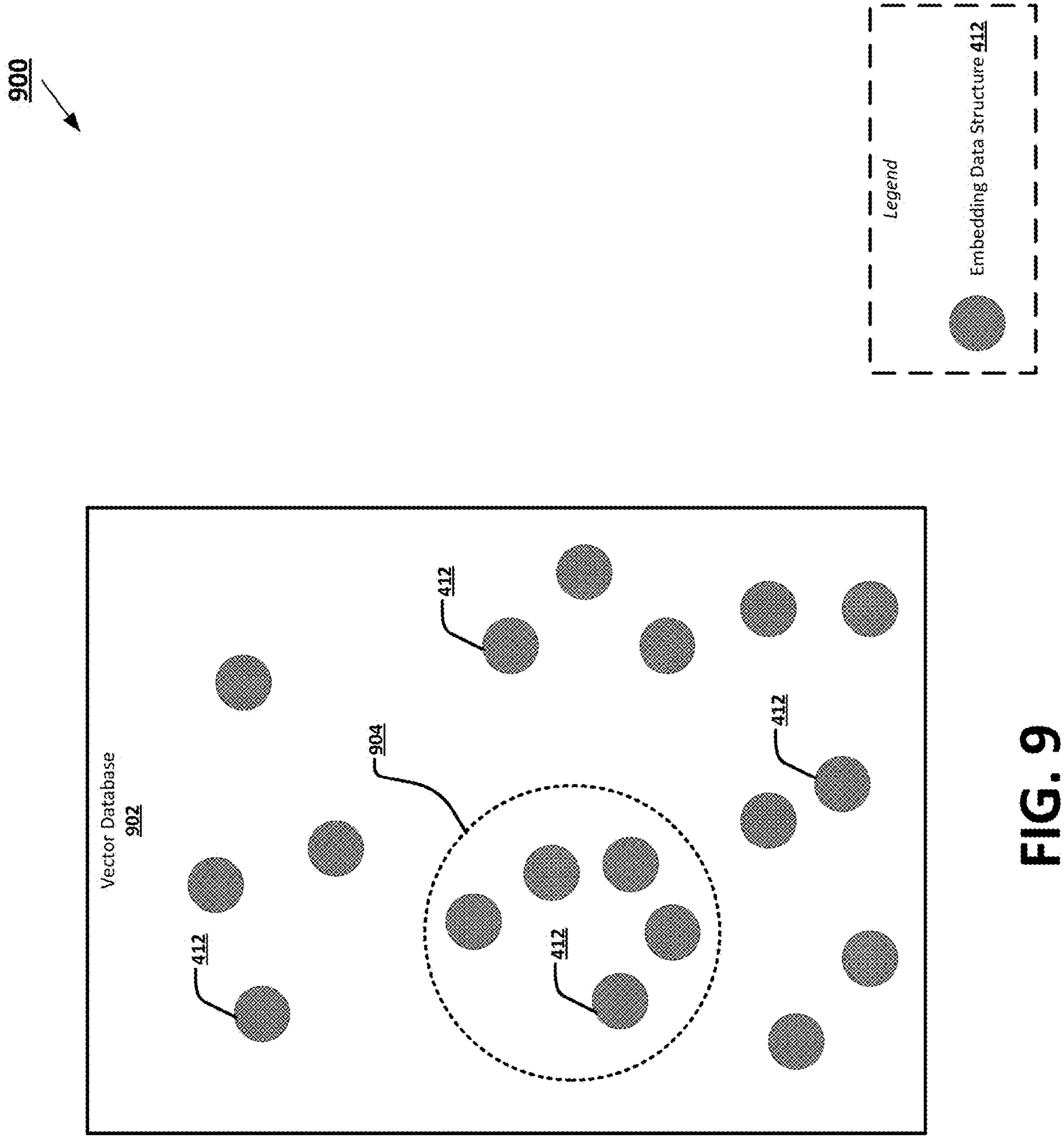
FIG. 9 depicts an example vector database in accordance with some embodiments of the present disclosure.

FIG. 9 depicts an example vector database 902 in accordance with one or more embodiments of the present disclosure. The vector database 902 may be configured to store one or more embedding data structures 412 (e.g., the set of embedding data structures 412*a-n*) for the set of data elements 402*a-n*. In some embodiments, the vector database 902 may be configured to store the one or more embedding data structures 412 (e.g., the set of embedding data structures 412*a-n*) in accordance with a set of clustering rules for the vector database 902. For example, the set of clustering rules may group embedding data structures in accordance with similarity criteria associated with a particular entity identifier and/or a particular computing domain. In some embodiments, the computing system 101 may query the vector database 902 to enable the comparison between the embedding data structure 412*a* and the entity embedding data structure 512. For example, the computing system 101 may query the vector database 902 to determine a subset of embedding data structures 904 that correspond to the subset of data elements 502.

Figure 10:
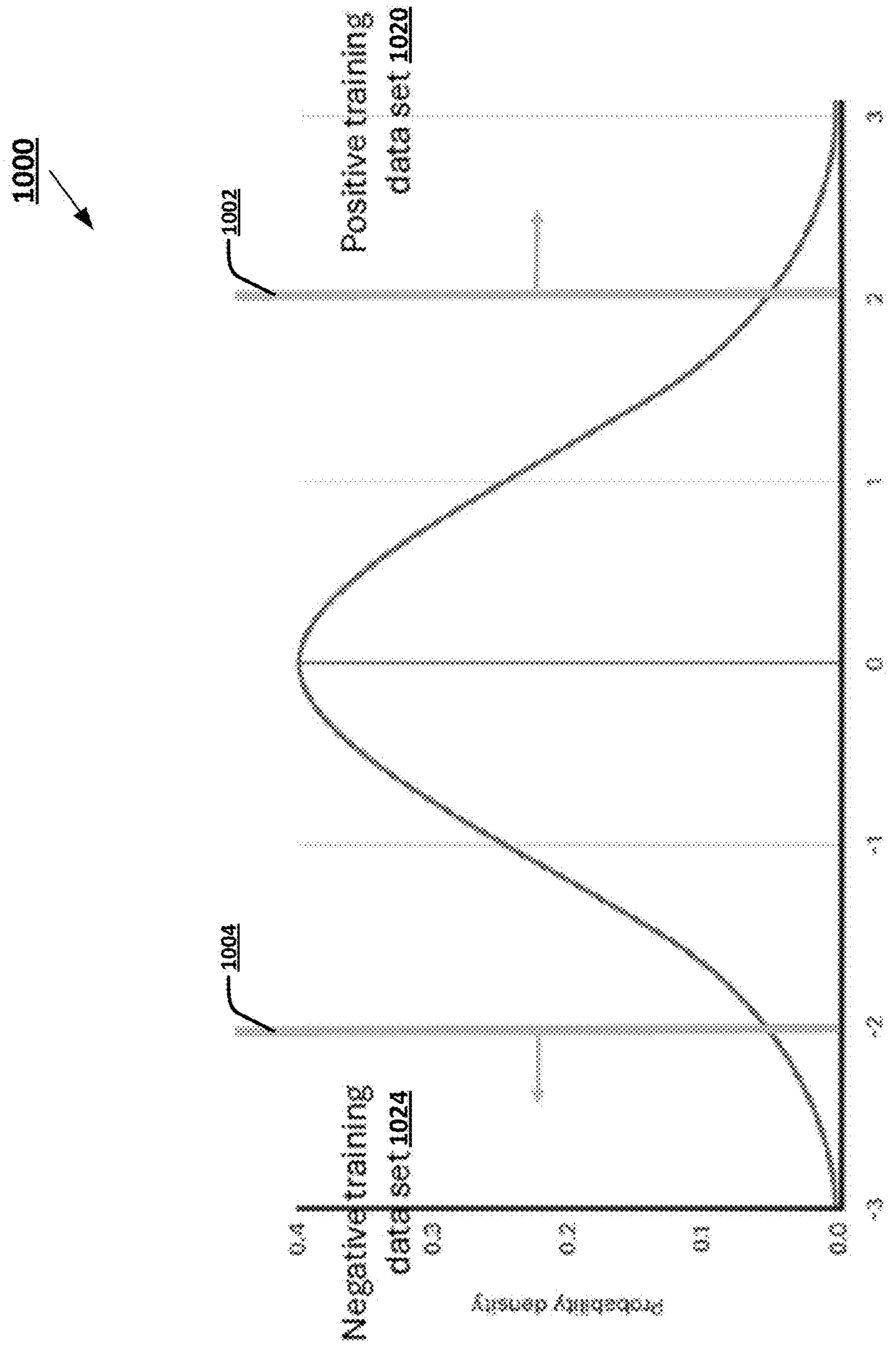
FIG. 10 depicts an example training dataset in accordance with some embodiments of the present disclosure.

FIG. 10 depicts an example training dataset 1000 in accordance with one or more embodiments of the present disclosure. For example, the training dataset 1000 may comprise a positive training dataset 1020 and/or a negative training dataset 1024. In some embodiments, the training dataset 1000 may correspond to at least a portion of the training dataset 520. In some embodiments, the computing system 101 may utilize a positive similarity threshold 1002 to determine the positive training dataset 1020. In addition or alternatively, the computing system 101 may utilize a negative similarity threshold 1004 to determine the negative training dataset 1024. In some embodiments, the computing system 101 may configure a value of the positive similarity threshold 1002 and/or the negative similarity threshold 1004 based on a Gaussian distribution of similarity scores for historical comparisons of embedding data structures. In some embodiments, the positive similarity threshold 1002 and/or the negative similarity threshold 1004 may correspond to the defined similarity threshold 507 utilized for the embedding comparison process 505.

Figure 11:
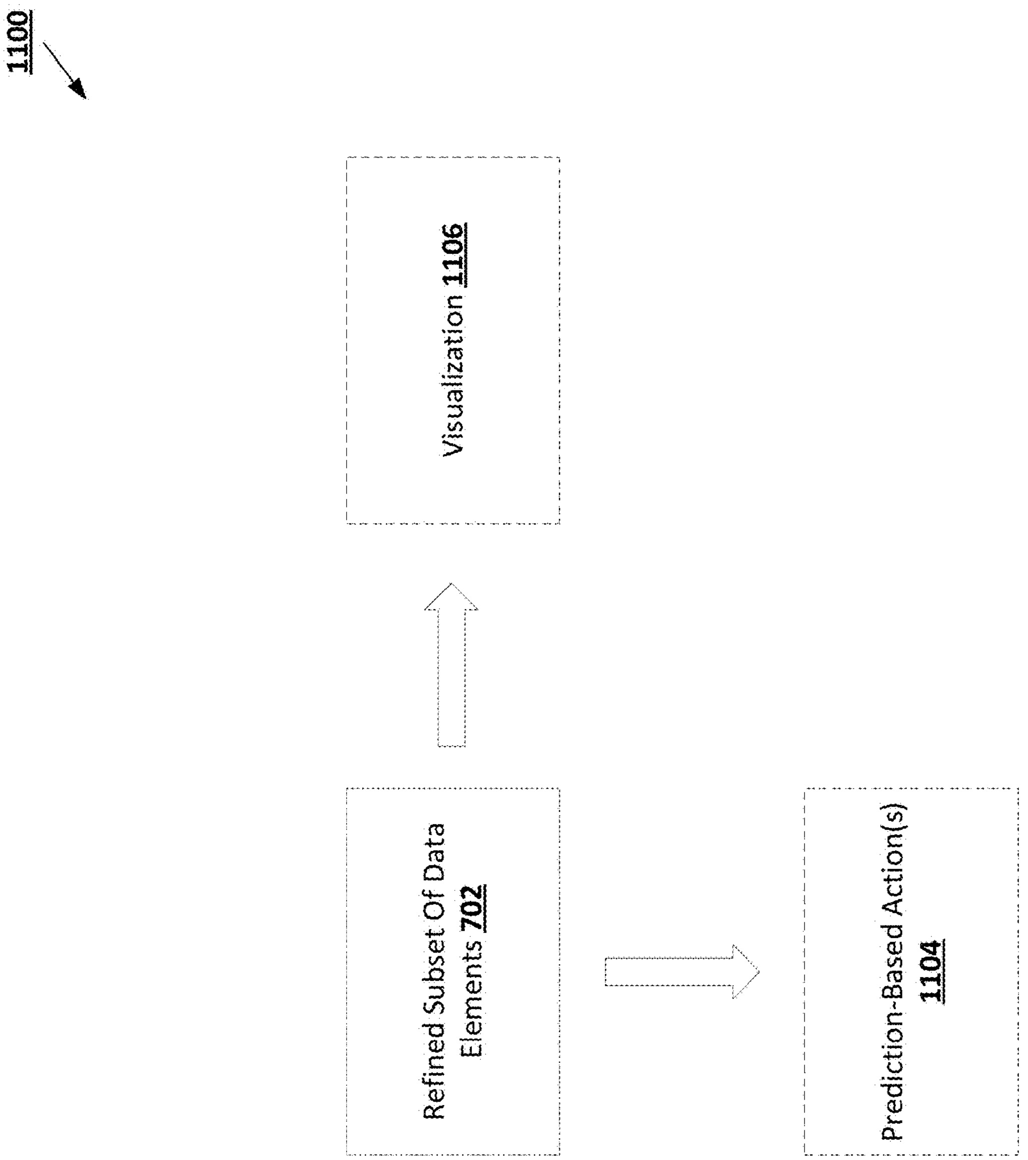
FIG. 11 depicts an example system for providing prediction-based actions and/or visualizations in accordance with some embodiments of the present disclosure.

FIG. 11 depicts an example system 1100 for providing prediction-based actions and/or visualizations, in accordance with one or more embodiments of the present disclosure. The system 1100 comprises the refined subset of data elements 702 provided by the machine learned entity classifier model 610. In one or more embodiments, one or more prediction-based actions 1104 are performed based on the refined subset of data elements 702. For example, the performance of the one or more prediction-based actions 1104 may be initiated based on the refined subset of data elements 702. In some embodiments, the performance of the one or more prediction-based actions 1104 may be initiated via an optimization model. For example, in some embodiments, the performance of the one or more prediction-based actions 1104 may be initiated via a predictive machine learned model that is trained for a different predictive task than the machine learned entity classifier model 610. In some embodiments, data associated with the refined subset of data elements 702 may be stored in a storage system, such as the volatile memory 215, the non-volatile memory 210, the volatile memory 322, or the non-volatile memory 324. The data stored in the storage system may be employed for providing user interface renderings, graphical visualizations, machine learning, recommendations, reporting, decision-making purposes, operations management, healthcare management, configuring a manufacturing device, and/or other purposes. In certain embodiments, the data stored in the storage system may be employed to provide one or more insights to assist with healthcare decision making processes, such as, medical decisions for a patient. In addition or alternatively, one or more machine learned models may be retrained based on one or more features associated with the refined subset of data elements 702. For example, one or more relationships between features mapped in the machine learned entity classifier model 610 may be adjusted (e.g., refitted, tuned, etc.) based on data associated with the refined subset of data elements 702. In another example, cross-validation, hyperparameter optimization, and/or regularization associated with the machine learned entity classifier model 610 may be adjusted based on one or more features associated with the refined subset of data elements 702. In addition or alternatively, a visualization 1106 may be generated based on the refined subset of data elements 702. The visualization 1106 may comprise, for example, one or more interactive graphical elements for a user interface (e.g., the user interface 802) based on the refined subset of data elements 702.

In some embodiments, the one or more prediction-based actions 1104 may comprise automated user interface actions, automated alerts, automated instructions to user devices, and/or automated adjustments to allocations of computing resources. Further, the one or more prediction-based actions 1104 may comprise automated physician notification actions, automated patient notification actions, automated appointment scheduling actions, automated prescription recommendation actions, automated record updating actions, automated datastore updating actions, automated workforce management operational management actions, automated server load balancing actions, automated resource allocation actions, automated pricing actions, automated plan update actions, automated alert generation actions, generating one or more electronic communications, and/or the like. The one or more prediction-based actions 1104 may further comprise displaying visual renderings of the aforementioned examples of prediction-based actions in addition to values, charts, and representations associated with the one or more policy scores and the prediction output using a prediction output user interface such as the visualization 1106.

Figure 12:
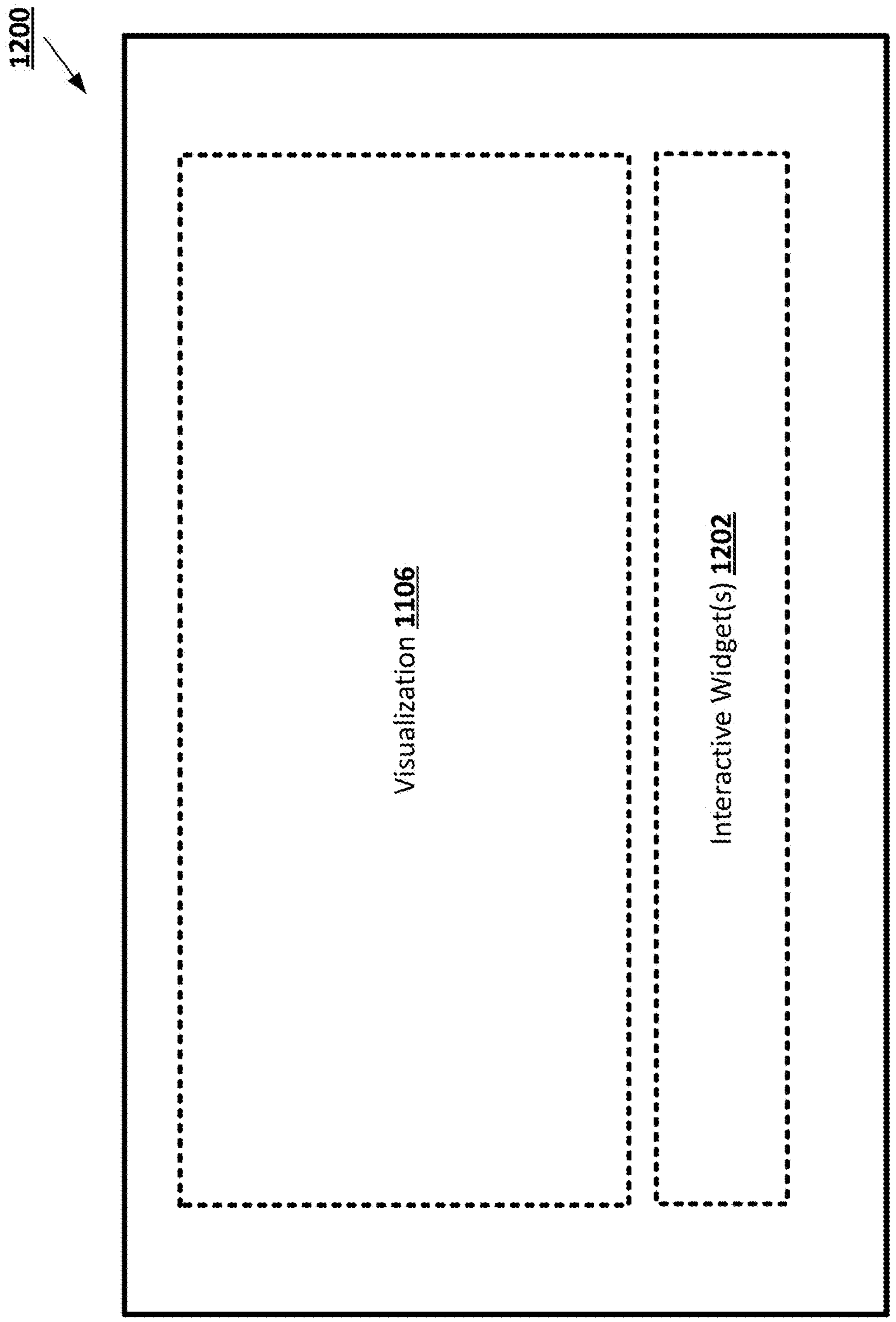
FIG. 12 depicts example user interface in accordance with some embodiments of the present disclosure.

FIG. 12 depicts an example user interface 1200, in accordance with one or more embodiments of the present disclosure. In one or more embodiments, the user interface 1200 is, for example, an electronic interface (e.g., a graphical user interface) of the client computing entity 102. In some embodiments, the user interface 1200 may be provided via the output device 316 of the client computing entity 102. In some embodiments, the user interface 1200 may correspond to the user interface 802. In some embodiments, the user interface 1200 is an electronic interface that provides a display and/or a visualization to a user via a user computing device. In some embodiments, the user interface 1200 provides a GUI and/or associated GUI wizard (e.g., executable code configured to control a functionality of GUI) that provides one or more interactive interface screens, representations, and/or widgets for interacting with a user. The user interface 1200 may be configured to provide, for display to a user, a visualization associated with the refined subset of data elements 702. In some embodiments, the user interface 1200 is configured to render an interactive visualization associated with the refined subset of data elements 702. For example, the user interface 1200 may be configured to render the visualization 706. In addition or alternatively, the user interface 1200 may be configured to render one or more interactive widgets 1202.

In various embodiments, the visualization 1106 may provide an interactive visualization associated with the refined subset of data elements 702 to initiate a rendering of a script and/or execution of one or more instruction sets associated with a visualization. In some embodiments, the one or more interactive widgets 1202 may be configured to receive user input to generate a request (e.g., the request 810). In various embodiments, the user interface 1200 may be configured as a web portal interface (e.g., a medical provider portal, etc.) for managing data insights, allocation of resources, and/or a resource manufacturing device. In some embodiments, a user interaction with a particular widget of the one or more interactive widgets 1202 may result in rendering of a new interactive widget and/or a new user interface. In some embodiments, the visualization 1106 rendered via the user interface 1200 may provide a rendering of a visualization associated with training dataset and/or configuration parameters during training and/or configuration of the machine learned entity classifier model 610. In some embodiments, one or more portions of the machine learned entity classifier model 610 may be configured based on a user interaction with respect to the visualization 706 and/or the one or more interactive widgets 1202.

In some embodiments, the visualization 1206 is configured to render one or more graphical elements associated with the refined subset of data elements 702. A graphical element may be a formatted version of one or more data objects to provide a visualization and/or human interpretation of data via the user interface 1200. In some embodiments, a graphical element is formatted for transmission via a network (e.g., the network 720), an API, a communication channel, a communication interface, the like, or combinations thereof. In one or more embodiments, a graphical element comprises one or more graphical elements and/or one or more textual elements that may be selectable and/or otherwise interacted with via the user interface 1200.

In some embodiments, the user interface 1200 is configured to provide visual data for a script associated with one or more prompts with respect to the user interface 1200. In some embodiments, a visualization associated with a script may be arranged relative to the one or more interactive widgets 1202 to enable user input with respect to the script. In some embodiments, the one or more interactive widgets 1202 enable a real-time workflow associated with a script. In this manner, the user interface 1200 may provide an interface between a user and a platform that enables a user to selectively a contribute to the real-time workflow associated with a script. In some embodiments, the user interface 1200 is configured to provide interaction with a large language model via one or more prompts and/or prompt responses provided via the one or more interactive widgets 1202.

The user interface 1200 may be specially configured to reduce the time, burden, and processing resources traditionally expended to ingest data from a plurality of data sources and/or the machine learned entity classifier model 610. To do so, the user interface 1200 may arrange an interactive representation relative to an optimal configuration of representations and corresponding interactive widgets 1202. The interactive representation and/or the one or more interactive widgets 1202 may be arranged to accommodate small screen sizes, such as mobile devices, laptops, etc., without reducing the efficacy of a reviewing process. This, in turn, allows the performance of traditionally complex data matching operations from a client device with small form factors.

Figure 13:
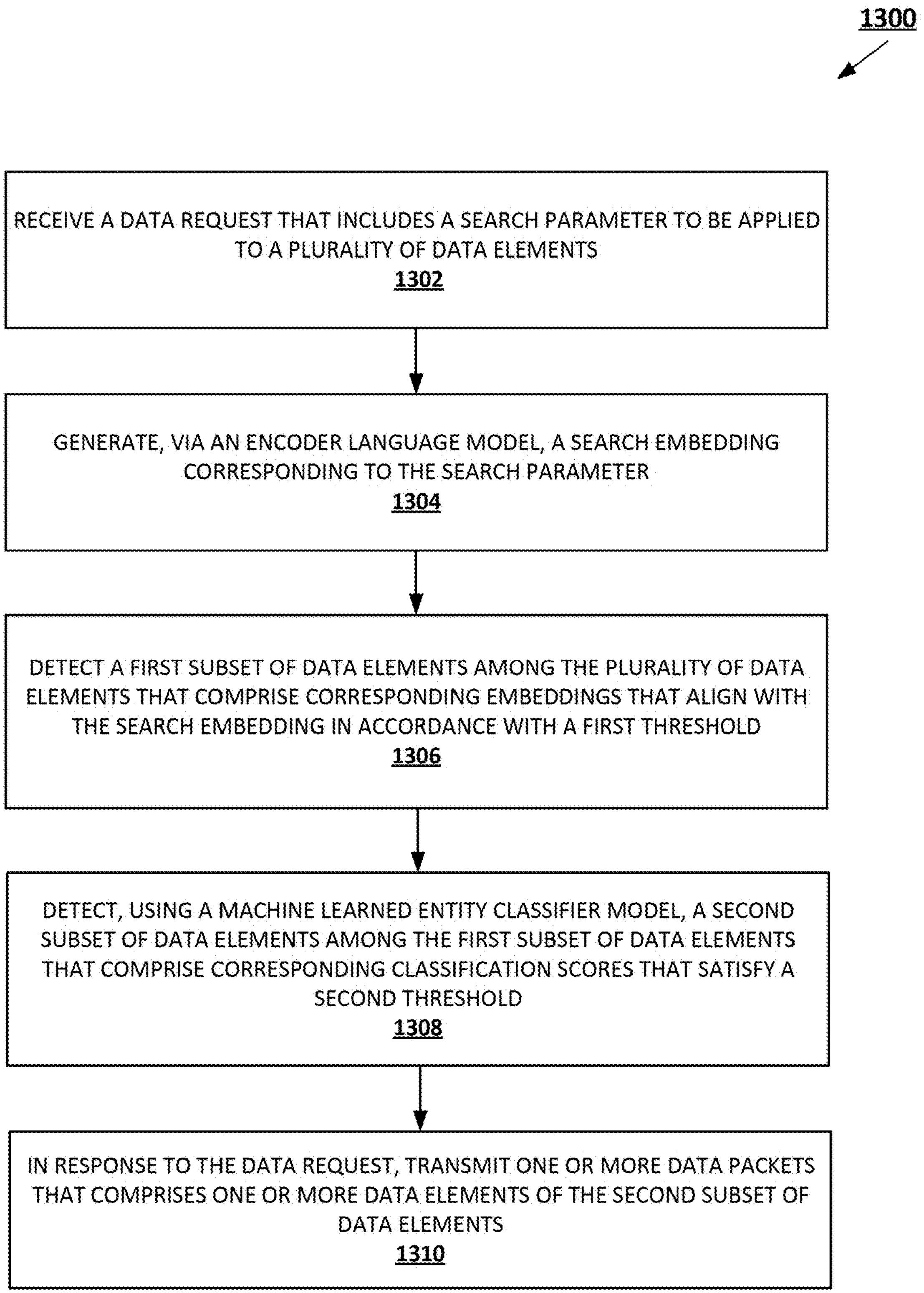
FIG. 13 depicts a flowchart diagram of example process for utilizing an automated language model-based training framework for machine learning classifiers in accordance with some embodiments of the present disclosure.

FIG. 13 depicts a flowchart diagram of an example process 1300 for utilizing an automated language model-based training framework for machine learning classifiers in accordance with some embodiments discussed herein. The process 1300 may be executed by one or more computing devices, entities, and/or systems (e.g., the computing system 101 and/or the predictive computing entity 106) described herein. For example, via the various steps/operations of the process 1300, the computing system 101 may leverage improved data pre-processing and/or modeling techniques to optimize an input dataset for a machine learned entity classifier model. By doing so, the process 1300 enables improved machine learning actions related to a defined computing task, while ensuring data quality and/or optimized computing resources in view of various data processing and/or modeling rules. In some embodiments, the process 1300 may be a multi-stage process that utilizes at least (i) a first stage associated with a comparison of data elements to determine a first subset of data elements that align with a data request that includes a search parameter and (ii) a second stage associated with utilization of a machine learned classifier model to detect a second subset of data elements among the first subset for a particular classification task.

FIG. 13 illustrates an example process 1300 for explanatory purposes. Although the example process 1300 depicts a particular sequence of steps/operations, the sequence may be altered without departing from the scope of the present disclosure. For example, some of the steps/operations depicted may be performed in parallel or in a different sequence that does not materially impact the function of the process 1300. In other examples, different components of an example device or system that implements the process 1300 may perform functions at substantially the same time or in a specific sequence.

In some embodiments, the process 1300 comprises, at step/operation 1302, receiving a data request that includes a search parameter to be applied to a plurality of data elements. For example, the computing system 101 may receive a data request that includes a search parameter to be applied to a plurality of data elements. In some embodiments, during preprocessing, the computing system 101 may store a plurality of embeddings for the plurality of data elements in a vector database in accordance with a set of clustering rules for the vector database. In some embodiments, the search parameter corresponds to and/or includes an entity identifier.

In some embodiments, the process 1300 comprises, at step/operation 1304, generating, via an encoder language model, a search embedding corresponding to the search parameter. For example, the computing system 101 may generate, via an encoder language model, a search embedding corresponding to the search parameter. In some embodiments, the search embedding may be an entity embedding data structure. In some embodiments, the computing system 101 may preprocess the plurality of data elements by generating, via the encoder language model, a plurality of embeddings corresponding to the plurality of data elements. In some embodiments, the encoder language model is fine tuned using a set of labeled data elements corresponding to the plurality of data elements. In some embodiments, a labeled data element of the set of labeled data elements comprises the search parameter and a binary label that identifies a presence or absence of an entity identifier within the search parameter. In some embodiments, the computing system 101 may generate the plurality of data elements from one or more input data object by parsing an input data object of a set of input data objects in accordance with a combined set of data chunking and context rules. In some embodiments, the combined set of data chunking and context rules enable formatting and sizing of the search embedding for the encoder language model in accordance with a type of domain for the search parameter.

In some embodiments, the process 1300 comprises, at step/operation 1306, detecting a first subset of data elements among the plurality of data elements that comprise corresponding embeddings that align with the search embedding in accordance with a first threshold. For example, at a first stage, the computing system 101 may detect a first subset of data elements among the plurality of data elements that comprise corresponding embeddings that align with the search embedding in accordance with a first threshold. In some embodiments, the first threshold is based on a Gaussian distribution of similarity scores for historical comparisons of embeddings. In some embodiments, the computing system 101 may query the vector database that comprises the plurality of embeddings to enable a comparison between the search embedding and the embeddings.

In some embodiments, the process 1300 comprises, at step/operation 1308, detecting, using a machine learned entity classifier model, a second subset of data elements among the first subset of data elements that comprise corresponding classification scores that satisfy a second threshold. For example, at a second stage, the computing system 101 may detect a second subset of data elements among the first subset of data elements that comprise corresponding classification scores that satisfy a second threshold. In some embodiments, the computing system 101 may use a machine learned entity classifier model to detect the second subset of data elements among the first subset of data elements. In some embodiments, the machine learned entity classifier model is trained with a training dataset to detect the second subset of data elements. The machine learned entity classifier model may be pre-trained or trained by the computing system 101. In some embodiments, the training dataset comprises a first sample data element (a) labeled with a first pseudo label and (b) comprising a first sample embedding that aligns with the search embedding in accordance with a third threshold that is associated with a greater similarity than the first threshold. In some embodiments, the training dataset comprises a second sample data element (a) labeled with a second pseudo label and (b) comprising a second sample embedding that differs from the search embedding in accordance with a fourth threshold that is associated with a lesser similarity than the first threshold.

In some embodiments, the training dataset comprises (i) a positive training dataset associated with the third threshold and (ii) a negative training dataset associated with the fourth threshold. In some embodiments, the computing system 101 may train the machine learned entity classifier model using supervised learning associated with the positive training dataset and the negative training dataset.

In some embodiments, in response to the data request, the process 1300 comprises, at step/operation 1310, transmitting one or more data packets that comprises one or more data elements of the second subset of data elements. For example, in response to the data request, the computing system 101 may transmit one or more data packets that comprises one or more data elements of the second subset of data elements.

In some embodiments, the computing system 101 may initiate the performance of a prediction-based action for the one or more data elements of the second subset of data elements. In some embodiments, the computing system 101 may modify the first threshold based on the performance of the prediction-based action.

Figure 14:
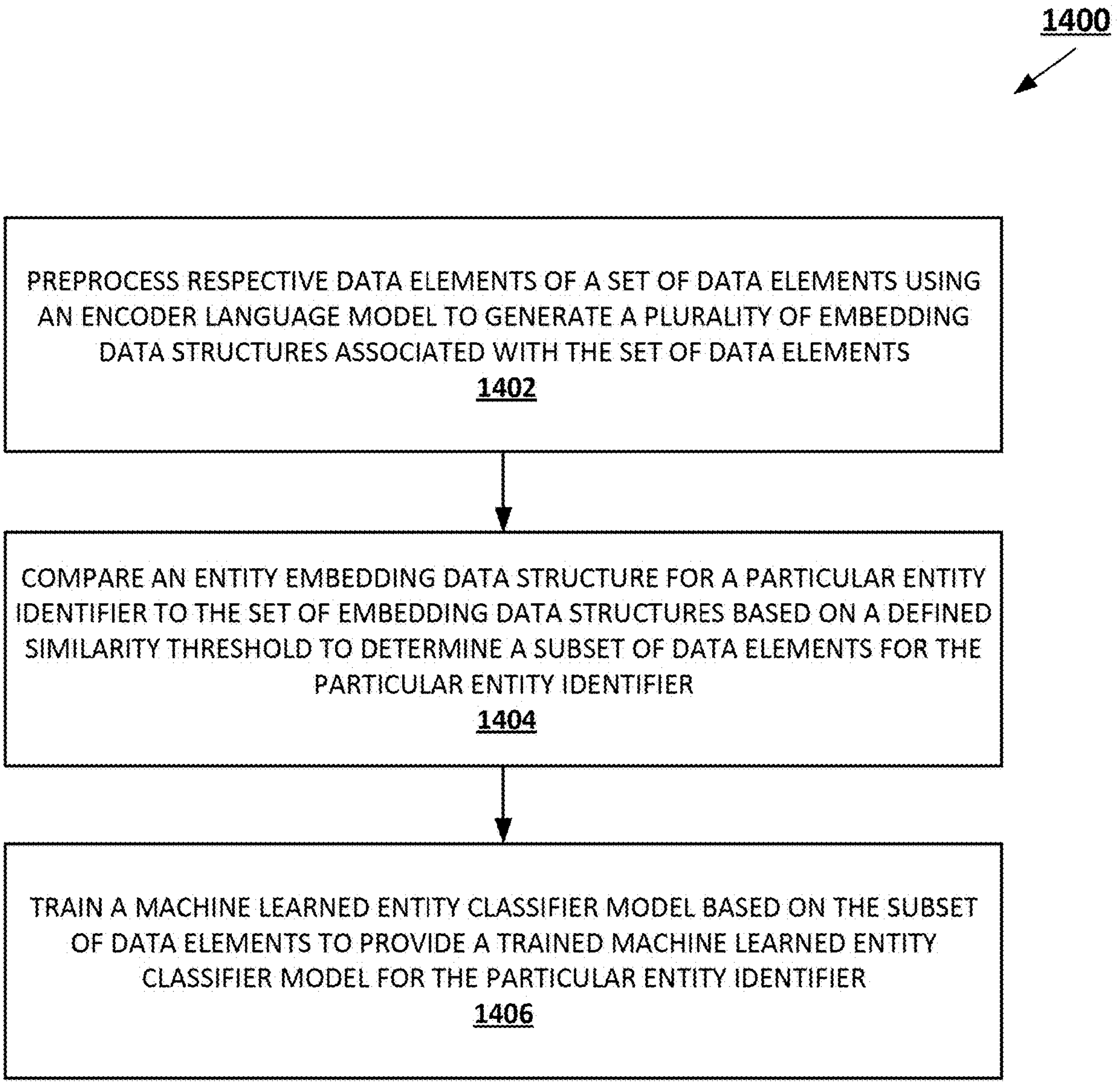
FIG. 14 depicts a flowchart diagram of example process for training an automated language model-based training framework for machine learning classifiers in accordance with some embodiments of the present disclosure.

FIG. 14 depicts a flowchart diagram of an example process 1400 for training an automated language model-based training framework for machine learning classifiers in accordance with some embodiments discussed herein. The process 1400 may be executed by one or more computing devices, entities, and/or systems (e.g., the computing system 101 and/or the predictive computing entity 106) described herein. For example, via the various steps/operations of the process 1400, the computing system 101 may leverage improved training techniques to optimize parameters, hyper-parameters, and/or weights for a machine learned entity classifier model. By doing so, the process 1400 enables improved machine learning actions related to a defined computing task, while ensuring data quality and/or optimized computing resources in view of various data processing and/or modeling rules.

FIG. 14 illustrates an example process 1400 for explanatory purposes. Although the example process 1400 depicts a particular sequence of steps/operations, the sequence may be altered without departing from the scope of the present disclosure. For example, some of the steps/operations depicted may be performed in parallel or in a different sequence that does not materially impact the function of the process 1400. In other examples, different components of an example device or system that implements the process 1400 may perform functions at substantially the same time or in a specific sequence.

In some embodiments, the process 1400 comprises, at step/operation 1402, preprocessing respective data elements of a set of data elements using an encoder language model to generate a plurality of embedding data structures associated with the set of data elements. For example, the computing system 101 may generate, using an encoder language model, an embedding data structure for a data element of a set of data elements.

In some embodiments, the process 1400 comprises, at step/operation 1404, comparing an entity embedding data structure for a particular entity identifier to the set of embedding data structures based on a defined similarity threshold to determine a subset of data elements for the particular entity identifier. For example, the computing system 101 may determine, by a subset of data elements for an entity identifier and from the set of data elements based on (a) an embedding similarity score between the embedding data structure and an entity embedding data structure corresponding to the entity identifier and (b) a defined similarity threshold.

In some embodiments, the process 1400 comprises, at step/operation 1406, training a machine learned entity classifier model based on the subset of data elements to provide a trained machine learned entity classifier model for the particular entity identifier. For example, the computing system 101 may generate, using the subset of data elements as at least a portion of a training dataset, a machine learned entity classifier model for the entity identifier. In some embodiments, the training dataset comprises a first sample data element (a) labeled with a first pseudo label and (b) comprising a first sample embedding that aligns with the entity embedding data structure in accordance with a threshold that is associated with a greater similarity than a defined similarity threshold. In some embodiments, the training dataset comprises a second sample data element (a) labeled with a second pseudo label and (b) comprising a second sample embedding that differs from the entity embedding data structure in accordance with a threshold that is associated with a lesser similarity than the defined similarity threshold.

In some embodiments, the computing system 101 may apply the trained machine learned entity classifier model to the set of data elements to generate a refined subset of the set of data elements for the particular entity identifier. For example, the computing system 101 may apply the machine learned entity classifier model to the set of data elements to determine a refined subset of the set of data elements for the entity identifier. In some embodiments, the computing system 101 may initiate the performance of a prediction-based action for the refined subset.

Some techniques of the present disclosure enable the generation of action outputs that may be performed to initiate one or more real world actions to achieve real-world effects. The machine learning and data scaling techniques of the present disclosure may be used, applied, and/or otherwise leveraged to augment a user interface, which may help in the creation and provisioning of messages across computing entities, as well as other downstream tasks such as rendering of a visualization via a user interface. For instance, generative output, using some of the techniques of the present disclosure, may trigger the performance of actions at a client device, such as the display, transmission, and/or the like of data reflective of a visualization. In some embodiments, the visualization may trigger an alert via a user interface.

In some examples, the computing tasks may comprise actions that may be based on a defined domain task and/or a particular computing task. A defined domain task and/or a particular computing task may comprise any environment in which computing systems may be applied to generate a visualization and initiate the performance of computing tasks responsive to a visualization. These actions may cause real-world changes, for example, by controlling a hardware component of a user device or a server device, providing alerts, interactive actions, and/or the like. For instance, actions may comprise the initiation of automated instructions across and between devices, automated notifications, automated scheduling operations, automated precautionary actions, automated security actions, automated data processing actions, and/or the like.

In some embodiments, an action (e.g., a prediction-based action) comprises real-time configuration of a user interface based on the refined subset to enable a user to consume visual data associated with the geographic location in an interactive manner, where the visual data is tailored based on the refined subset. In some embodiments, an action (e.g., a prediction-based action) comprises an automated drug manufacturing, routing, and/or storage action. For instance, responsive to refined subset, the computing system 101 may provide one or more instructions to a resource manufacturing device (e.g., a pharmaceutical manufacturing device, etc.) to cause a development of one or more resources (e.g., one or more pharmaceutical resources, one or more hospital resources, one or more medications, etc.). In some examples, the one or more instructions may be tailored to the geographic location. In some embodiments, an action (e.g., a prediction-based action) comprises providing input to an optimization model based on the refined subset to identify, for example, one or more geographic locations for allocating resources (e.g., allocating pharmaceutical resources, hospital resources, medications, etc.).

IV. CONCLUSION

Throughout this specification, components, operations, or structures described as a single instance may be implemented as multiple instances. Although individual operations of one or more methods (or processes, techniques, routines, etc.) are illustrated and described as separate operations, two or more of the individual operations may be performed concurrently or otherwise in parallel, and nothing requires that the operations be performed in the order illustrated. Structures and functionality (e.g., operations, steps, blocks) presented as separate components in example configurations may be implemented as a combined structure, functionality, or component. Similarly, structures and functionality presented as a single component may be implemented as separate components. These and other variations, modifications, additions, and improvements fall within the scope of the subject matter herein. Certain embodiments are described herein as including logic or a number of routines, subroutines, applications, operations, blocks, or instructions. These may constitute and/or be implemented by software (e.g., code embodied on a non-transitory, machine-readable medium), hardware, or a combination thereof. In hardware, the routines, etc., may represent tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware component that operates to perform certain operations as described herein.

In various embodiments, a hardware component may be implemented mechanically or electronically. For example, a hardware component may comprise dedicated circuitry or logic that is permanently configured (e.g., as a special-purpose processor, such as a field programmable gate array (FPGA) or an application-specific integrated circuit (ASIC)) to perform certain operations. A hardware component may also or instead comprise programmable logic or circuitry (e.g., as encompassed within one or more general-purpose processors and/or other programmable processor(s)) that is temporarily configured by software to perform certain operations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where the hardware components comprise a general-purpose processor configured using software, the general-purpose processor may be configured as respective different hardware components at different times. Software may accordingly configure a processor, for example, to constitute a particular hardware component at one instance of time and to constitute a different hardware component at a different instance of time.

Hardware components may provide information to, and receive information from, other hardware components. Accordingly, the described hardware components may be regarded as being communicatively coupled. Where multiple of such hardware components exist contemporaneously, communications may be achieved through signal transmission (e.g., over appropriate circuits and buses) that connect the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and may operate on a resource (e.g., a collection of information).

As noted above, the various operations of example methods (or processes, techniques, routines, etc.) described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Moreover, each operation of processes illustrated as logical flow graphs may represent a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions comprise routines, programs, objects, components, data structures, and the like that perform particular functions or implement particular data types. The order in which the operations are described is not intended to be construed as a limitation, and any number of the described operations may be combined in any order and/or in parallel to implement the processes.

The terms "coupled" and "connected," along with their derivatives, may be used. In particular embodiments, "connected" may be used to indicate that two or more elements are in direct physical or electrical contact with each other, although the context in the description may dictate otherwise when it is apparent that two or more elements are not in direct physical or electrical contact. "Coupled" may mean that two or more elements are in direct physical or electrical contact. However, "coupled" may also mean that two or more elements are not in direct contact with each other, yet still co-operate, transmit between, or interact with each other.

An algorithm may be considered to be a self-consistent sequence of acts or operations leading to a desired result. These comprise physical manipulations of physical quantities. Usually, though not necessarily, these quantities take the form of electrical, magnetic, or optical signals capable of being stored, transferred, combined, compared, and otherwise manipulated. These signals are commonly referred to as bits, values, elements, symbols, characters, terms, numbers, flags, or the like. It should be understood, however, that all of these and similar terms are to be associated with the appropriate physical quantities and are merely convenient labels applied to these quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "one embodiment," "an embodiment," "in some examples," or variations thereof means that a particular element, feature, structure, characteristic, operation, or the like described in connection with the embodiment is comprised in at least one embodiment, but not every embodiment necessarily comprises the particular element, feature, structure, characteristic, operation, or the like. Different instances of such a reference in various places in the specification do not necessarily all refer to the same embodiment, although they may in some cases. Moreover, different instances of such a reference may describe elements, features, structures, characteristics, operations, or the like be combined in any manner as an embodiment.

As used herein, the terms "comprises," "comprising," "comprises," "including," "has," "having" or any other variation thereof, are intended to cover a non-exclusive inclusion. For example, a process, method, article, or apparatus that comprises a list of elements is not necessarily limited to only those elements but may comprise other elements not expressly listed or inherent to such process, method, article, or apparatus. Further, unless the context of use clearly indicates otherwise, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "set" is intended to mean a collection of elements and may be a null set (i.e., a set containing zero elements) or may comprise one, two, or more elements. A "subset" is intended to mean a collection of elements that are all elements of a set, but that does not comprise other elements of the set. A first subset of a set may comprise zero, one, or more elements that are also elements of a second subset of the set. The first subset may be said to be a subset of the second subset if all the elements of the first subset are elements of the second subset, while also being a subset of the set. However, if all the elements of the second subset are also elements of the first subset (in addition to all the elements of the first subset being elements of the second subset), the first subset and the second subset are a single subset/not distinct.

For the purposes of the present disclosure, the term "a" or "an" entity refers to one or more of that entity. As such, the terms "a" or "an", "one or more", and "at least one" may be used interchangeably herein unless explicitly contradicted by the specification using the word "only one" or similar. For example, "a first element" may functionally be interpreted as "a first one or more elements" or a "first at least one element." Unless otherwise apparent from the context of use, reference in the present disclosure to a same set of "one or more processors" (or a same "plurality of processors," etc.) performing multiple operations may encompass implementations in which performance of the operations is divided among the processor(s) in any suitable way. For example, "generating, by one or more processors, X; and generating, by the one or more processors, Y" may encompass: (1) implementations in which a first subset of the processors (e.g., in a first computing device) generates X and an entirely distinct, second subset of the processors (e.g., in a different, second computing device) independently generates Y; (2) implementations in which one or more or all of the processor(s) (e.g., one or multiple processors in the same device, or multiple processors distributed among multiple devices) contribute to the generation of X and/or Y; and (3) other variations. This may similarly be applied to any other component or feature similarly recited (e.g., as "a component", "a feature", "one or more components", "one or more features", "a plurality of components", "a plurality of features"). Moreover, the performance of certain of the operations may be distributed among the one or more components, not only residing within a single machine, but deployed across a number of machines. The set of components may be located in a single geographic location (e.g., within a home environment, an office environment, a cloud environment). In other example embodiments, the set of components may be distributed across two or more geographic locations. Further, "a machine-learned model", equivalent terms (e.g., "machine learning model," "machine-learning model," "machine-learned component", "artificial intelligence", "artificial intelligence component"), or species thereof (e.g., "a large language model", "a neural network") may comprise a single machine-learned model or multiple machine-learned models, such as a pipeline comprising two or more machine-learned models arranged in series and/or parallel, an agentic framework of machine-learned models, or the like.

An "artificial intelligence" or "artificial intelligence component" may comprise a machine-learned model. A machine-learned model may comprise a hardware and/or software architecture having structural hyperparameters defining the model's architecture and/or one or more parameters (e.g., coefficient(s), weight(s), biase(s), activation function(s) and/or action function type(s) in examples where the activation function and/or function type is determined as part of training, clustering centroid(s)/medoid(s), partition(s), number of trees, tree depth, split parameters) determined as a result of training the machine-learned model based at least in part on training hyperparameters (e.g., for supervised, semi-supervised, and reinforcement learning models) and/or by iteratively operating the machine-learned model according to the training hyperparameters (e.g., for unsupervised machine-learned models).

In some examples, structural hyperparameter(s) may define component(s) of the model's architecture and/or their configuration/order, such as the configuration/order specifying which input(s) are provided to one component and which output(s) of that component are provided as input to other component(s) of the machine-learned model; a number, type, and/or configuration of component(s) per layer; a number of layers of the model; a number and/or type of input nodes in an input layer of the model; a number and/or type of nodes in a layer; a number and/or type of output nodes of an output layer of the model; component dimension (e.g., input size versus output size); a number of trees; a maximum tree depth; node split parameters; minimum number of samples in a leaf node of a tree; and/or the like. The component(s) of the model may comprise one or more activation functions and/or activation function type(s) (e.g., gated linear unit (GLU), such as a rectified linear unit (ReLU), leaky RELU, Gaussian error linear unit (GELU), Swish, hyperbolic tangent), one or more attention mechanism and/or attention mechanism types (e.g., self-attention, cross-attention), nodes and split indications and/or probabilities in a decision tree, and/or various other component(s) (e.g., adding and/or normalization layer, pooling layer, filter). Various combinations of any these components (as defined by the structural hyperparameter(s)) may result in different types of model architectures, such as a transformer-based machine-learned model (e.g., encoder-only model(s), encoder-decoder model(s), decoder-only models, generative pre-trained transformer(s) (GPT(s))), neural network(s), multi-layer perceptron(s), Kolmogorov-Arnold network(s), clustering algorithm(s), support vector machine(s), gradient boosting machine(s), and/or the like. The structural parameters and components a machine-learned model comprises may vary depending on the type of machine-learned model.

Training hyperparameter(s) may be used as part of training or otherwise determining the machine-learned model. In some examples, the training hyperparameter(s), in addition to the training data and/or input data, may affect determining the parameter(s) of the target machine-learned model. Using a different set of training hyperparameters to train two machine-learned models that have the same architecture (i.e., the same structural hyperparameters) and using the same training data may result in the parameters of the first machine-learned model differing from the parameters of the second machine-learned model. Despite having the same architecture and having been trained using the same training data, such machine-learned models may generate different outputs from each other, given the same input data. Accordingly, accuracy, precision, recall, and/or bias may vary between such machine-learned models.

In some examples, training hyperparameter(s) may comprise a train-test split ratio, activation function and/or activation function type (e.g., in examples like Kolmogorov-Arnold networks (KANs) where the activation function type is determined as part of training from an available set of activation functions and/or limits on the activation function parameters specified by the training hyperparameters), training stage(s) (e.g., using a first set of hyperparameters for a first epoch of training, a second set of hyperparameters for a second epoch of training), a batch size and/or number of batches of data in a training epoch, a number of epochs of training, the loss function used (e.g., L1, L2, Huber, Cauchy, cross entropy), the component(s) of the machine-learned model that are altered using the loss for a particular batch or during a particular epoch of training (e.g., some components may be "frozen," meaning their parameters are not altered based on the loss), learning rate, learning rate optimization algorithm type (e.g., gradient descent, adaptive, stochastic) used to determine an alteration to one or more parameters of one or more components of the machine-learned model to reduce the loss determined by the loss function, learning rate scheduling, and/or the like.

In some examples, the structural hyperparameters and/or the training hyperparameters may be determined by a hyperparameter optimization algorithm or based on user input, such as a software component written by a user or generated by a machine-learned model. The machine-learned model may comprise any type of model configured, trained, and/or the like to generate a prediction output for a model input. In some examples, any of the logic, component(s), routines, and/or the like discussed herein may be implemented as a machine-learned model.

The machine-learned model may comprise one or more of any type of machine-learned model including one or more supervised, unsupervised, semi-supervised, and/or reinforcement learning models. Training a machine-learned model may comprise altering one or more parameters of the machine-learned model (e.g., using a loss optimization algorithm) to reduce a loss. Depending on whether the machine-learned model is supervised, semi-supervised, unsupervised, etc. this loss may be determined based at least in part on a difference between an output generated by the model and ground truth data (e.g., a label, an indication of an outcome that resulted from a system using the output), a cost function, a fit of the parameter(s) to a set of data, a fit of an output to a set of data, and/or the like. In some examples, determining an output by a machine-learned model may comprise executing a set of inference operations executed by the machine-learned model according to the target machine-learned model's parameter(s) and structural hyperparameter(s) and using/operating on a set of input data.

Moreover, any discussion of receiving data associated with an individual that may be protected, confidential, or otherwise sensitive information, is understood to have been preceded by transmitting a notice of use of the data to a computing device, account, or other identifier (collectively, "identifier") associated with the individual, receiving an indication of authorization to use the data from the identifier, and/or providing a mechanism by which a user may cause use of the data to cease or a copy of the data to be provided to the user.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112 (f) unless traditional means-plus-function language is expressly recited, such as "means for" or "step for" language being explicitly recited in the claim(s).

V. EXAMPLES

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may comprise a single computing entity that is configured to perform all of the steps/operations of a particular example. In addition, or alternatively, a computing system may comprise multiple dedicated computing entities that are respectively configured to perform one or more of the steps/operations of a particular example. By way of example, the multiple dedicated computing entities may coordinate to perform all of the steps/operations of a particular example.

Example 1. A computer-implemented method comprising: receiving, by one or more processors, a data request that includes a search parameter to be applied to a plurality of data elements; generating, by the one or more processors and via an encoder language model, a search embedding corresponding to the search parameter; at a first stage, detecting, by the one or more processors, a first subset of data elements among the plurality of data elements that comprise corresponding embeddings that align with the search embedding in accordance with a first threshold; at a second stage, detecting, by the one or more processors, a second subset of data elements among the first subset of data elements that comprise corresponding classification scores that satisfy a second threshold, wherein detecting the second subset of data elements comprises using a machine learned entity classifier model that is trained with a training dataset that comprises: (1) a first sample data element (a) labeled with a first pseudo label and (b) comprising a first sample embedding that aligns with the search embedding in accordance with a third threshold that is associated with a greater similarity than the first threshold; and (2) a second sample data element (a) labeled with a second pseudo label and (b) comprising a second sample embedding that differs from the search embedding in accordance with a fourth threshold that is associated with a lesser similarity than the first threshold; and in response to the data request, transmitting, by the one or more processors, one or more data packets that comprises one or more data elements of the second subset of data elements.

Example 2. The computer-implemented method of example 1, further comprising: preprocessing the plurality of data elements by generating, via the encoder language model, a plurality of embeddings corresponding to the plurality of data elements.

Example 3. The computer-implemented method of any of the above examples, wherein the training dataset comprises (i) a positive training dataset associated with the third threshold and (ii) a negative training dataset associated with the fourth threshold.

Example 4. The computer-implemented method of any of the above examples, further comprising: training the machine learned entity classifier model using supervised learning associated with the positive training dataset and the negative training dataset.

Example 5. The computer-implemented method of any of the above examples, wherein the encoder language model is fine tuned using a set of labeled data elements corresponding to the plurality of data elements, wherein a labeled data element of the set of labeled data elements comprises the search parameter and a binary label that identifies a presence or absence of an entity identifier within the search parameter.

Example 6. The computer-implemented method of any of the above examples, further comprising: generating the plurality of data elements from one or more input data object by parsing an input data object of a set of input data objects in accordance with a combined set of data chunking and context rules.

Example 7. The computer-implemented method of any of the above examples, wherein the combined set of data chunking and context rules enable formatting and sizing of the search embedding for the encoder language model in accordance with a type of domain for the search parameter.

Example 8. The computer-implemented method of any of the above examples, wherein the first threshold is based on a Gaussian distribution of similarity scores for historical comparisons of embeddings.

Example 9. The computer-implemented method of any of the above examples, further comprising: initiating the performance of a prediction-based action for the one or more data elements of the second subset of data elements; and modifying the first threshold based on the performance of the prediction-based action.

Example 10. The computer-implemented method of any of the above examples, further comprising: storing a plurality of embeddings for the plurality of data elements in a vector database in accordance with a set of clustering rules for the vector database; and querying the vector database that comprises the plurality of embeddings to enable a comparison between the search embedding and the embeddings.

Example 11. A system comprising: one or more processors; and one or more memories storing processor-executable instructions that, when executed by the one or more processors, cause the one or more processors to perform operations comprising: receiving a data request that includes a search parameter to be applied to a plurality of data elements; generating, via an encoder language model, a search embedding corresponding to the search parameter; at a first stage, detecting a first subset of data elements among the plurality of data elements that comprise corresponding embeddings that align with the search embedding in accordance with a first threshold; at a second stage, detecting a second subset of data elements among the first subset of data elements that comprise corresponding classification scores that satisfy a second threshold, wherein detecting the second subset of data elements comprises using a machine learned entity classifier model that is trained with a training dataset that comprises: (1) a first sample data element (a) labeled with a first pseudo label and (b) comprising a first sample embedding that aligns with the search embedding in accordance with a third threshold that is associated with a greater similarity than the first threshold; and (2) a second sample data element (a) labeled with a second pseudo label and (b) comprising a second sample embedding that differs from the search embedding in accordance with a fourth threshold that is associated with a lesser similarity than the first threshold; and in response to the data request, transmitting one or more data packets that comprises one or more data elements of the second subset of data elements.

Example 12. The system of example 11, wherein the one or more processors further perform operations comprising: preprocessing the plurality of data elements by generating, via the encoder language model, a plurality of embeddings corresponding to the plurality of data elements.

Example 13. The system of any of the above examples, wherein the training dataset comprises (i) a positive training dataset associated with the third threshold and (ii) a negative training dataset associated with the fourth threshold.

Example 14. The system of any of the above examples, wherein the one or more processors further perform operations comprising: training the machine learned entity classifier model using supervised learning associated with the positive training dataset and the negative training dataset.

Example 15. The system of any of the above examples, wherein the encoder language model is fine tuned using a set of labeled data elements corresponding to the plurality of data elements, wherein a labeled data element of the set of labeled data elements comprises the search parameter and a binary label that identifies a presence or absence of an entity identifier within the search parameter.

Example 16. The system of any of the above examples, wherein the one or more processors further perform operations comprising: generating the plurality of data elements from one or more input data object by parsing an input data object of a set of input data objects in accordance with a combined set of data chunking and context rules.

Example 17. The system of any of the above examples, wherein the combined set of data chunking and context rules enable formatting and sizing of the search embedding for the encoder language model in accordance with a type of domain for the search parameter.

Example 18. The system of any of the above examples, wherein the first threshold is based on a Gaussian distribution of similarity scores for historical comparisons of embeddings.

Example 19. The system of any of the above examples, wherein the one or more processors further perform operations comprising: initiating the performance of a prediction-based action for the one or more data elements of the second subset of data elements; and modifying the first threshold based on the performance of the prediction-based action.

Example 20. One or more non-transitory computer-readable media storing processor-executable instructions that, when executed by one or more processors, cause the one or more processors to perform operations comprising: receiving a data request that includes a search parameter to be applied to a plurality of data elements; generating, via an encoder language model, a search embedding corresponding to the search parameter; at a first stage, detecting a first subset of data elements among the plurality of data elements that comprise corresponding embeddings that align with the search embedding in accordance with a first threshold; at a second stage, detecting a second subset of data elements among the first subset of data elements that comprise corresponding classification scores that satisfy a second threshold, wherein detecting the second subset of data elements comprises using a machine learned entity classifier model that is trained with a training dataset that comprises: (1) a first sample data element (a) labeled with a first pseudo label and (b) comprising a first sample embedding that aligns with the search embedding in accordance with a third threshold that is associated with a greater similarity than the first threshold; and (2) a second sample data element (a) labeled with a second pseudo label and (b) comprising a second sample embedding that differs from the search embedding in accordance with a fourth threshold that is associated with a lesser similarity than the first threshold; and in response to the data request, transmitting one or more data packets that comprises one or more data elements of the second subset of data elements.

Example 21. The computer-implemented method of example 1, wherein the method further comprises training the machine learned entity classifier model.

Example 22. The computer-implemented method of example 21, wherein the training is performed by the one or more processors.

Example 23. The computer-implemented method of example 21, wherein the one or more processors are comprised in a first computing entity; and the training is performed by one or more other processors comprised in a second computing entity.

Example 24. The computing system of example 11, wherein the one or more processors are further configured to train the machine learned entity classifier model.

Example 25. The computing system of example 24, wherein the one or more processors are comprised in a first computing entity; and the machine learned entity classifier model is trained by one or more other processors comprised in a second computing entity.

Example 26. The one or more non-transitory computer-readable storage media of example 20, wherein the instructions further cause the one or more processors to train the machine learned entity classifier model.

Example 27. The one or more non-transitory computer-readable storage media of example 26, wherein the one or more processors are comprised in a first computing entity; and the machine learned entity classifier model is trained by one or more other processors comprised in a second computing entity.

The invention claimed is:

1. A computer-implemented method comprising:

receiving, by one or more processors, a data request that includes a search parameter to be applied to a plurality of data elements, wherein the search parameter is associated with an entity identifier that provides a link between two or more data elements;

generating, by the one or more processors and via an encoder language model, a search embedding corresponding to the search parameter;

at a first stage, detecting, by the one or more processors, a first subset of data elements among the plurality of data elements that comprise corresponding embeddings that align with the search embedding in accordance with a first threshold;

at a second stage, detecting, by the one or more processors, a second subset of data elements among the first subset of data elements that comprise corresponding classification scores that satisfy a second threshold, wherein detecting the second subset of data elements comprises using a machine learned entity classifier model that is trained with a training dataset generated based on an output of the encoder language model, wherein the training dataset comprises:

(1) a first sample data element (a) labeled with a first pseudo label and (b) comprising a first sample embedding that aligns with the search embedding in accordance with a third threshold that is associated with a greater similarity than the first threshold; and (2) a second sample data element (a) labeled with a second pseudo label and (b) comprising a second sample embedding that differs from the search embedding in accordance with a fourth threshold that is associated with a lesser similarity than the first threshold; and in response to the data request, transmitting, by the one or more processors, one or more data packets that comprise one or more data elements of the second subset of data elements.

2. The computer-implemented method of claim 1, further comprising:

preprocessing the plurality of data elements by generating, via the encoder language model, a plurality of embeddings corresponding to the plurality of data elements.

3. The computer-implemented method of claim 1, wherein the training dataset comprises (i) a positive training dataset associated with the third threshold and (ii) a negative training dataset associated with the fourth threshold.

4. The computer-implemented method of claim 3, further comprising:

training the machine learned entity classifier model using supervised learning associated with the positive training dataset and the negative training dataset.

5. The computer-implemented method of claim 1, wherein the encoder language model is fine tuned using a set of labeled data elements corresponding to the plurality of data elements, wherein a labeled data element of the set of labeled data elements comprises the search parameter and a binary label that identifies a presence or absence of the entity identifier.

6. The computer-implemented method of claim 1, further comprising:

generating the plurality of data elements from one or more input data objects by parsing an input data object of a set of input data objects in accordance with a combined set of data chunking and context rules.

7. The computer-implemented method of claim 6, wherein the combined set of data chunking and context rules enable formatting and sizing of the search embedding for the encoder language model in accordance with a type of domain for the search parameter.

8. The computer-implemented method of claim 1, wherein the first threshold is based on a Gaussian distribution of similarity scores for historical comparisons of embeddings.

9. The computer-implemented method of claim 1, further comprising:

initiating the performance of a prediction-based action for the one or more data elements of the second subset of data elements; and modifying the first threshold based on the performance of the prediction-based action.

10. The computer-implemented method of claim 1, further comprising:

storing a plurality of embeddings for the plurality of data elements in a vector database in accordance with a set of clustering rules for the vector database; and querying the vector database that comprises the plurality of embeddings to enable a comparison between the search embedding and the plurality of embeddings.

11. A system comprising:

one or more processors; and one or more non-transitory computer readable media storing processor-executable instructions that, when executed by the one or more processors, cause the one or more processors to perform operations comprising:

receiving a data request that includes a search parameter to be applied to a plurality of data elements, wherein the search parameter is associated with an entity identifier that provides a link between two or more data elements;

generating, via an encoder language model, a search embedding corresponding to the search parameter;

at a first stage, detecting a first subset of data elements among the plurality of data elements that comprise corresponding embeddings that align with the search embedding in accordance with a first threshold;

at a second stage, detecting a second subset of data elements among the first subset of data elements that comprise corresponding classification scores that satisfy a second threshold, wherein detecting the second subset of data elements comprises using a machine learned entity classifier model that is trained with a training dataset generated based on an output of the encoder language model, wherein the training dataset comprises:

(1) a first sample data element (a) labeled with a first pseudo label and (b) comprising a first sample embedding that aligns with the search embedding in accordance with a third threshold that is associated with a greater similarity than the first threshold; and (2) a second sample data element (a) labeled with a second pseudo label and (b) comprising a second sample embedding that differs from the search embedding in accordance with a fourth threshold that is associated with a lesser similarity than the first threshold; and in response to the data request, transmitting one or more data packets that comprise one or more data elements of the second subset of data elements.

12. The system of claim 11, wherein the one or more processors further perform operations comprising:

preprocessing the plurality of data elements by generating, via the encoder language model, a plurality of embeddings corresponding to the plurality of data elements.

13. The system of claim 11, wherein the training dataset comprises (i) a positive training dataset associated with the third threshold and (ii) a negative training dataset associated with the fourth threshold.

14. The system of claim 13, wherein the one or more processors further perform operations comprising:

training the machine learned entity classifier model using supervised learning associated with the positive training dataset and the negative training dataset.

15. The system of claim 11, wherein the encoder language model is fine tuned using a set of labeled data elements corresponding to the plurality of data elements, wherein a labeled data element of the set of labeled data elements comprises the search parameter and a binary label that identifies a presence or absence of the entity identifier.

16. The system of claim 11, wherein the one or more processors further perform operations comprising:

generating the plurality of data elements from one or more input data objects by parsing an input data object of a set of input data objects in accordance with a combined set of data chunking and context rules.

17. The system of claim 16, wherein the combined set of data chunking and context rules enable formatting and sizing of the search embedding for the encoder language model in accordance with a type of domain for the search parameter.

18. The system of claim 11, wherein the first threshold is based on a Gaussian distribution of similarity scores for historical comparisons of embeddings.

19. The system of claim 11, wherein the one or more processors further perform operations comprising:

initiating the performance of a prediction-based action for the one or more data elements of the second subset of data elements; and modifying the first threshold based on the performance of the prediction-based action.

20. One or more non-transitory computer-readable media storing processor-executable instructions that, when executed by one or more processors, cause the one or more processors to perform operations comprising:

receiving a data request that includes a search parameter to be applied to a plurality of data elements, wherein the search parameter is associated with an entity identifier that provides a link between two or more data elements;

generating, via an encoder language model, a search embedding corresponding to the search parameter;

at a first stage, detecting a first subset of data elements among the plurality of data elements that comprise corresponding embeddings that align with the search embedding in accordance with a first threshold;

at a second stage, detecting a second subset of data elements among the first subset of data elements that comprise corresponding classification scores that satisfy a second threshold, wherein detecting the second subset of data elements comprises using a machine learned entity classifier model that is trained with a training dataset generated based on an output of the encoder language model, wherein the training dataset comprises:

(1) a first sample data element (a) labeled with a first pseudo label and (b) comprising a first sample embedding that aligns with the search embedding in accordance with a third threshold that is associated with a greater similarity than the first threshold; and (2) a second sample data element (a) labeled with a second pseudo label and (b) comprising a second sample embedding that differs from the search embedding in accordance with a fourth threshold that is associated with a lesser similarity than the first threshold; and in response to the data request, transmitting one or more data packets that comprise one or more data elements of the second subset of data elements.

* * * * *